US008811379B2

(12) United States Patent
Yoshiuchi et al.

(10) Patent No.: US 8,811,379 B2
(45) Date of Patent: Aug. 19, 2014

(54) CONTROL APPARATUS AND CONTROL METHOD

(75) Inventors: Hideya Yoshiuchi, Yokohama (JP); Yuanchen Ma, Beijing (CN); Xuan He, Beijing (CN)

(73) Assignee: Hitachi, Ltd., Tokyo (JP)

( * ) Notice: Subject to any disclaimer, the term of this patent is extended or adjusted under 35 U.S.C. 154(b) by 141 days.

(21) Appl. No.: 13/541,828

(22) Filed: Jul. 5, 2012

(65) Prior Publication Data
US 2013/0010621 A1     Jan. 10, 2013

(30) Foreign Application Priority Data

Jul. 7, 2011     (CN) .......................... 2011 1 0189565

(51) Int. Cl.
*H04L 12/28*     (2006.01)
(52) U.S. Cl.
USPC .......................................... 370/351; 370/401
(58) Field of Classification Search
USPC ......... 370/238, 252, 254, 255, 328, 338, 351, 370/400, 401
See application file for complete search history.

(56) References Cited

U.S. PATENT DOCUMENTS

| 5,721,727 | A * | 2/1998 | Ashi et al. ...................... 370/244 |
| 7,414,977 | B2 * | 8/2008 | Orlik et al. ...................... 370/238 |
| 8,213,409 | B2 * | 7/2012 | Rudnick et al. ................ 370/351 |
| 8,554,928 | B2 * | 10/2013 | Craig et al. ..................... 709/228 |
| 2002/0044531 | A1 * | 4/2002 | Cooper et al. ................. 370/248 |
| 2003/0076800 | A1 * | 4/2003 | Otani ............................ 370/335 |
| 2004/0001497 | A1 * | 1/2004 | Sharma ......................... 370/401 |
| 2008/0013459 | A1 * | 1/2008 | Do et al. ....................... 370/248 |
| 2010/0284287 | A1 * | 11/2010 | Venuto ........................... 370/252 |
| 2012/0236724 | A1 * | 9/2012 | Rudnick et al. ............... 370/236 |

FOREIGN PATENT DOCUMENTS

JP     2009-159457 A     7/2009

* cited by examiner

*Primary Examiner* — Hong Cho
(74) *Attorney, Agent, or Firm* — Crowell & Moring LLP

(57) ABSTRACT

The control apparatus is provided with a channel quality test module for collecting power consumption between adjacent gateways of the data transmission routes, a communication interface for collecting data delay of the respective gateways of the data transmission routes by performing data communication with the gateways, a memory for storing a gateway routing table containing the multiple data transmission routes, the power consumption collected by the channel quality test module, and the data delay collected by the communication interface, and a processor for adding priority to the multiple data transmission routes in the gateway routing table stored in the memory on the basis of the power consumption and data delay stored in the memory.

4 Claims, 14 Drawing Sheets

CONTROL APPARATUS AND CONTROL METHOD

INCORPORATION BY REFERENCE

The present application claims priority from Japanese application CNP201110189565.5 filed on Jul. 7, 2011, the content of which is hereby incorporated by reference into this application.

BACKGROUND OF THE INVENTION

The present invention relates to a control apparatus and a control method, and more particularly to a control apparatus and a control method which are related to a data transmission and a transfer mechanism of a multiple gateway communication system.

The data transfer mechanism of the multiple gateway communication system can be assumed to be an on-demand routing protocol, but its one very important object is energy saving of a network system and how to extend the life of the network. AODV (Ad hoc on-demand distance vector) routing protocol is a typical on-demand routing protocol, and the conventional AODV achieves the energy saving object by creation and update of routing with the "minimum number of hops" used as a parameter, and reduction of the number of hops to simplify the structure of routing. However, the creation and update of routing by the above method cause that some network devices of the network are more susceptible to communications than other devices, the power for the network devices is consumed fast, and the life time of the entire network is reduced.

For such problems, some solutions are exhibited by a conventional technology. For example, JP-A-2009-159457 has proposed a mechanism that creates a routing table on the basis of information about a radio propagation condition and shuts down a wireless terminal configuring an unused communication route, thereby aiming to reduce power consumption of the entire Ad hoc network and to extend the life time.

Specifically, according to JP-A-2009-159457, a transmission source terminal device creates a routing table according to the received power of a relay device (gateway), a remaining battery level, position information, and a packet arrival rate. Among them, it is judged on the basis of the received power of the relay device that the relay device has stopped its operation or moved to outside of the wireless communication range. And, it is also judged on the basis of the remaining battery level of the relay device how long the relay device having a low remaining battery level can still operate. It is also judged on the basis of the position information of the relay device whether the relay device has stopped its operation or it has moved to outside of the wireless communication range. Last, a transmission condition of wireless signals with the relay device is judged on the basis of the packet arrival rate of the relay device. Thus, a routing table is created and the communication route is switched to secure that at least one communication route can be used, and the wireless terminal configuring the unused communication route is shut down. By the above technology, the power consumption of the entire Ad hoc network is reduced, and the life time of the entire Ad hoc communication system can be extended.

However, JP-A-2009-159457 leaves the following technical problems unsolved.

(1) JP-A-2009-159457 can reduce the power consumption of the entire multiple gateway communication system by shutting down the gateways configuring the unused communication route, but it does not consider a difference in power consumption generated during communications of individual gateways with adjacent gateways, and an adjacent gateway having low power consumption cannot be selected for communication by creating the routing table. Therefore, JP-A-2009-159457 cannot realize optimization in reduction of the power consumption of the whole configuring the multiple gateway communication system and the power consumption of the respective adjacent gateways of the multiple gateway communication system.

(2) JP-A-2009-159457 does not make reference to the data delay generated when the respective gateways configuring the multiple gateway communication system perform data transmission. That is, a data delay generated from a busy gateway is long and a data delay generated from the gateway in an idle state is short, but JP-A-2009-159457 cannot shorten the data delay by selecting the gateway in an idle state. Today, demands for a real time property of network communications are increasing higher and higher, and more strict delay threshold control is demanded when specially urgent data (such as fire alarm data involved in smart building control) is sent. However, it is apparent that JP-A-2009-159457 does not meet the above demands.

(3) JP-A-2009-159457 has no reference to the effective code rate at the time of performing data communication between the respective gateways. That is, in a case where the communication condition is poor or a communication distance between the gateways is long, a high forward error correction code rate is necessary to assure the reliability of data, but it decreases the effective code rate at the time of data communication, resulting in lowering the efficiency of data communication. However, JP-A-2009-159457 does not consider the creation of the routing table at the effective code rate.

(4) JP-A-2009-159457 uses the remaining battery level as an important parameter when the routing table is created, but the remaining battery level is applied to only a communication device for which a battery is used to supply power. Therefore, it is hard to apply JP-A-2009-159457 to the communication device which supplies power by means of a power source or another method.

As described above, for the multiple gateway communication system, both power consumption and data delay are very important elements. Demands for power consumption and data delay by the communication system are increasing higher and higher today, but a conventional technology represented by JP-A-2009-159457 cannot achieve both power consumption and data delay.

And, for the multiple gateway communication system, the effective code rate is also a very important element other than the power consumption and the data delay. Obviously, it is more impossible for the conventional technology represented by JP-A-2009-159457 to consider three items of power consumption, data delay and effective code rate at the same time.

And, for the multiple gateway communication system, it is possible to include not only the terminal that uses a battery to supply power but also a device that supplies power by a power source or another method. Therefore, the conventional technology represented by JP-A-2009-159457 is hardly applied to the multiple gateway communication system including a device that supplies power by anything other than the battery.

SUMMARY OF THE INVENTION

The present invention has been made in view of the above circumstances and provides a control apparatus and control method for multiple gateway communication system that can reduce power consumption of the network and delay of important data by optimizing a data transfer strategy from a terminal side gateway to a main gateway in the multiple gateway communication system, and improves the performance of the entire system as a result.

The present invention also provides a control apparatus and a control method for a multiple gateway communication system that can consider three items of power consumption, data delay and effective code rate at the same time and realizes the improvement of the performance of the entire system as a result.

The present invention also provides a control apparatus and a control method for a multiple gateway communication system that can be applied to a multiple gateway communication system including a device which supplies power by anything other than a battery.

To realize the above object, the present invention provides a control apparatus for a multiple gateway communication system having multiple data transmission routes for transmitting data via gateways, comprising a channel quality test module for collecting power consumption between adjacent gateways of the data transmission routes, a communication interface for collecting data delay of the respective gateways of the data transmission routes by performing data communication with the gateways, a memory for storing a gateway routing table containing the multiple data transmission routes, the power consumption collected by the channel quality test module, and the data delay collected by the communication interface, and a processor for adding priority to the multiple data transmission routes in the gateway routing table stored in the memory on the basis of the power consumption and data delay stored in the memory.

The present invention also provides a control method for a multiple gateway communication system having multiple data transmission routes for transmission of data via gateways, comprising a power consumption collection step for collecting power consumption between adjacent gateways of the data transmission routes, a data delay collection step for collecting data delay of respective gateways of the data transmission routes, and a routing table optimization step for adding priority to the data transmission routes in the gateway routing table containing the multiple data transmission routes on the basis of the power consumption collected in the power consumption collection step and the data delay collected in the data delay collection step.

The control apparatus and control method according to the present invention can reduce the power consumption of the multiple gateway communication system and can reduce a data delay, and they improve the performance of the entire network by realizing both the power consumption and the delay.

In addition, in the control apparatus according to the present invention, the channel quality test module further collects effective code rates of the data transmission routes, the memory further stores the effective code rates collected by the channel quality test module, and the processor adds priority to the multiple data transmission routes in the gateway routing table stored in the memory on the basis of the power consumption, data delay and effective code rates stored in the memory.

And, the control method according to the present invention also includes an effective code rate collection step for collecting effective code rates of the data transmission routes, wherein the routing table optimization step adds priority to the data transmission routes in the gateway routing table containing the multiple data transmission routes on the basis of the power consumption collected in the power consumption collection step, the data delay collected in the data delay collection step, and the effective code rates collected in the effective code rate collection step.

Thus, the power consumption of the multiple gateway communication system is reduced, the data delay is reduced, and the effective code rate can also be improved, and the performance of the entire network is improved by realizing simultaneous consideration of three items of power consumption, delay and effective code rate.

In addition, in the control apparatus according to the present invention, the communication interface receives from the first gateway of the data transmission routes a data delay threshold requested for the data collected by the first gateway, and the processor deletes the data transmission route having the total delay larger than the data delay threshold from the gateway routing table stored in the memory on the basis of the data delay threshold received from the communication interface and adds priority to the data transmission routes remained in the gateway routing table.

The control method according to the present invention further comprises a data delay threshold receiving step for receiving from a first gateway of the data transmission routes a data delay threshold which is requested for the data collected by the first gateway, wherein the routing table optimization step deletes a data transmission route having a total delay larger than the data delay threshold from the gateway routing table containing the multiple data transmission routes on the basis of the data delay threshold received in the data delay threshold receiving step, and adds priority to the data transmission routes remained in the gateway routing table.

Thus, when the first gateway of the data transmission route receives important data and urgent data (e.g., fire alarm data of smart building control), the transmission can be performed on the basis of the requested delay threshold, and appropriate transmission of the important data and urgent data can be secured.

In addition, in the control apparatus according to the present invention, the data collected by the first gateway is classified into an extensible type and a fixed type according to the data delay threshold, the processor previously creates for the fixed type of data a gateway routing table with priority added, and the processor deletes for the extensible type of data a data transmission route having a total delay larger than the data delay threshold from the previously created gateway routing table on the basis of the data delay threshold of a network routing table request sent from the first gateway to the communication interface, newly adds priority to the data transmission routes remained in the gateway routing table, and sends the gateway routing table, to which the priority is newly added, to the first gateway via the communication interface.

And, in the control method according to the present invention, the data collected by the first gateway is classified into an extensible type and a fixed type according to the data delay threshold, the routing table optimization step creates previously for the fixed type of data a gateway routing table having priority added, the routing table optimization step further deletes for the extensible type of data a data transmission route having a total delay larger than the data delay threshold from the previously created gateway routing table on the basis of the data delay threshold of the network routing table request from the first gateway received in the data delay threshold receiving step, newly adds priority to the data transmission routes remained in the gateway routing table, and sends the gateway routing table, to which the priority is newly added, to the first gateway.

Thus, in the case where a new gateway routing table is requested according to the data type received by the first gateway of the data transmission route, the gateway routing table optimized according to the data type can be sent to the first gateway so that the first gateway transmits the data by using an optimum data transmission route. Thus, data transmission efficiency and performance of the entire network can be improved.

Other objects, features and advantages of the invention will become apparent from the following description of the embodiments of the invention taken in conjunction with the accompanying drawings.

DESCRIPTION OF THE EMBODIMENTS

<1. Embodiment 1>

Embodiment 1 of the present invention is described below with reference to FIG. 1 to FIG. 6. Embodiment 1 is an embodiment in which two important indexes of both power consumption and delay are established by the multiple gateway communication system.

First, the whole concept of Embodiment 1 is described briefly. That is, data delay can be reduced well by sending data to a gateway device in an idle state after the characteristics of the multiple gateway communication system are analyzed, but if the idle-state gateway device is far away from a transmitting end gateway, large transmission power is required, and a large amount of power is consumed. If a near gateway device is selected and transmission is made, the power consumption can be reduced, but it was found that the data delay cannot be ensured. In connection with the above problem, the conventional technology is hard to realize simultaneous minimization of data delay and power consumption of the network. In Embodiment 1, their balance is realized by adding a data transfer strategy corresponding to one control apparatus. The multiple gateway communication system according to Embodiment 1 is described below in detail.

<1-1. Multiple Gateway Communication System>

Figure 1:
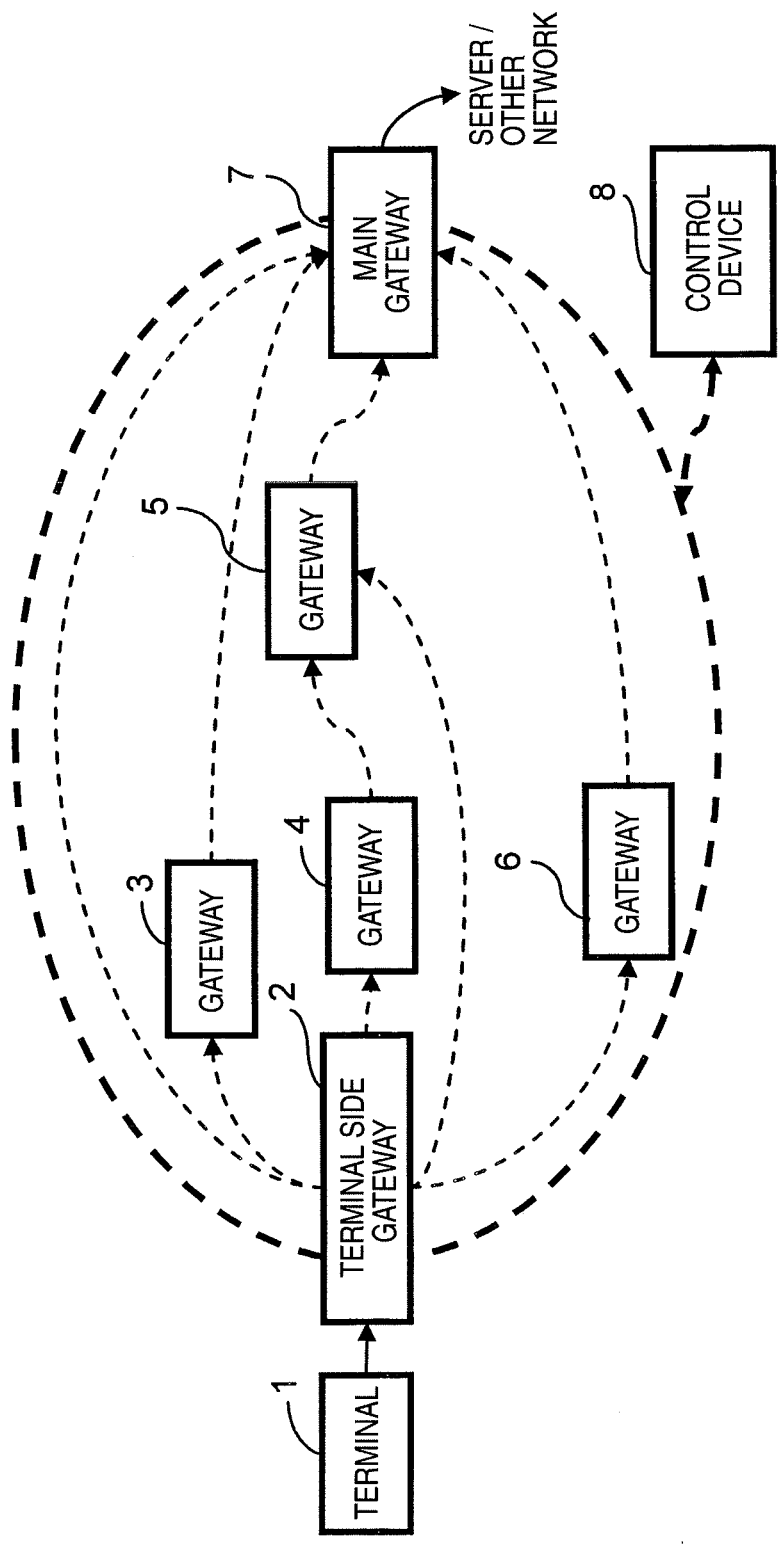
FIG. 1 is a configuration diagram of the multiple gateway communication system according to Embodiment 1 of the present invention.

FIG. 1 is a configuration diagram of the multiple gateway communication system according to Embodiment 1 of the present invention.

As shown in FIG. 1, the multiple gateway communication system according to Embodiment 1 is configured of two or more gateways 2 to 7 and at least one control apparatus 8. The gateways here include at least one terminal side gateway 2 communicable with a terminal 1, a main gateway 7 which is finally connected to another management terminal such as a server or the Internet, and other several gateways 3 to 6 which configure data transmission routes and transfer data. Here, the gateway 2 is a terminal side gateway which communicates with the terminal, but it is merely an example, and another gateway (e.g., gateways 3 to 6) may become a terminal side gateway which communicates with the terminal.

In the multiple gateway communication system of Embodiment 1, if the terminal 1 needs to send data to the main gateway 7, a wireless connection is first established with the nearest gateway 2, it is set as the own terminal side gateway, and then the data is sent. The terminal side gateway 2 needs to establish a communication network with the other gateways within a communication range, thereby transferring the data to the main gateway by the network. To select an optimum transfer route, the terminal side gateway 2 needs to collect information on the communication power consumption with the adjacent gateway and a data delay time of the gateway, and a final strategy is determined based on the collected information. However, it is not convenient to collect information on the entire network and to make strategy decision according to the respective terminal side gateways, and there is also a possibility that information might be overlapped. Therefore, in Embodiment 1, the control apparatus 8 is used to create a routing table for each gateway in the system and to execute a maintenance function, and calculation and judgment related to the data transfer strategy are made, and in the end, a command and route information are sent to the gateway device appropriately.

Individual components of the multiple gateway communication system are described below.

<1-1-1. Terminal 1>

The terminal 1 is a terminal device of the network to collect and send data, provided with a sensor module required to collect data satisfying an applied scene and a wired or wireless communication module required for a transmission function, and required to be able to realize a control function on the basis of the received command. The terminal 1 may be multiple in a single network, selects an appropriate gateway access on the basis of a communication protocol complying with the applied scene, and then send and receive data. In this scene, the gateway to which the terminal 1 belongs is a terminal side gateway 2.

<1-1-2. Terminal Side Gateway 2>

The terminal side gateway 2 is an edge gateway in the network, namely a first gateway of the data transmission route in the multiple gateway communication system, and sends the data collected by the terminal 1 to the main gateway 7 through an appropriate route. The terminal side gateway 2 is provided with a wired or wireless communication module, which is in communication with at least the terminal 1 and the other gateways 3 to 6, a data processing function, a management function for accessing on/off to the terminal, and a protocol conversion function. The terminal side gateway 2 can be accessed by multiple terminals 1, and the number of accesses is determined by the hardware capability of the gateway and protocol support. The network between the terminal side gateway 2 and the terminal 1 may be a wireless network or a wired network. The network between the terminal side gateway 2 and the other gateways 3 to 6 and the main gateway 7 is a wireless network supporting a multi-hop topology.

<1-1-3. Transfer Gateways 3 to 6>

The gateways 3 to 6 are transfer gateways in this system and transfer data to a next hop gateway according to the routing table of the terminal side gateway. All of the gateways 3 to 6 are required to have a wireless communication module to communicate with at least the other gateways 3 to 6 and the terminal side gateway 2, and a data processing function. Thus, the gateways 3 to 6 constitute multiple data transmission routes from the terminal side gateway 2 to the main gateway 7, and FIG. 1 shows several data transmission routes such as the terminal side gateway 2-gateway 3-main gateway 7, the terminal side gateway 2-gateway 4-gateway 5-main gateway 7, the terminal side gateway 2-gateway 5-main gateway 7, and the terminal side gateway 2-gateway 6-main gateway 7. And, there is also a data transmission route such as the terminal side gateway 2-main gateway 7.

<1-1-4. Main Gateway 7>

The main gateway 7 is an edge gateway of the network and the server or other networks, and sends the received data to the server or the other networks. The main gateway 7 is required to have at least a wireless communication module to communicate with the gateways 3 to 6 in the network, or communication capacity with the terminal side gateway 2, and high gateway performance (communication capacity, data processing capacity, and management capacity). At the same time, it is also required to have interface with the server and the other networks, and a corresponding protocol conversion function.

<1-1-5. Control Apparatus 8>

The control apparatus 8 is an important apparatus of Embodiment 1, performs collection and analysis of information of the terminal side gateway 2 and the transfer gateways 3 to 6 in the entire multiple gateway communication system, and optimizes the data transfer route from the terminal side gateway 2 to the main gateway 7. The control apparatus 8 is required to have at least a gateway channel quality test function, a gateway parameter collection function, and functions to perform a calculation, a data processing and strategy judgment required for route optimization.

In the multiple gateway communication system of Embodiment 1, the terminal 1 needs to send data to the main gateway 7 at the time of system initialization. First, data is sent to the terminal side gateway 2, and then the data transfer must be performed. Here, it is determined that information of the gateways 2 to 6 is collected and analyzed by the control apparatus 8, a gateway routing table with priority added is created on the basis of the power consumption between the respective gateways and the data delay of the respective gateways of the data transmission route, and the terminal side gateway 2 selects an optimum data transmission route and performs data transfer.

In the entire multiple gateway communication system, a technical point is the optimization of the data transmission route as described above, and technological features contributing to the conventional technology include mainly the functions of the transfer gateways 3 to 6 and the function of the control apparatus 8. Therefore, the functions of the transfer gateways 3 to 6 and the modules to be provided to the hardware device of the control apparatus 8 are described below in detail.

<1-2. Hardware Modules of Transfer Gateways 3 to 6>

Figure 2:
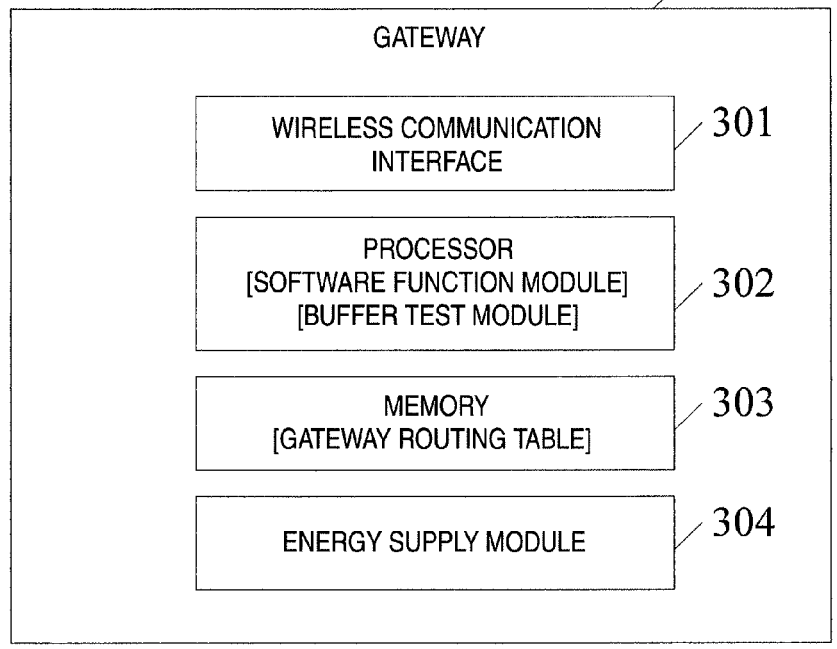
FIG. 2 is a hardware configuration diagram of the transfer gateway according to Embodiment 1 of the present invention.

FIG. 2 is a hardware configuration diagram of the transfer gateway 3 according to Embodiment 1 of the present invention. The gateway 3 is required to have at least the hardware modules shown in FIG. 2 to perform basic functions such as wireless communication transmission and reception, routing table selection, and self-judgment of a delay. Here, a hardware structure of the transfer gateway 3 is exemplified, and other transfer gateways also have a structure according to at least the same structure.

<1-2-1. Wireless Communication Interface 301>

A wireless communication interface 301 communicates with the other gateways 2 to 7 and the control apparatus 8 of the network to realize data exchange. The ability of communication module of the wireless communication interface 301 is determined according to the technical requirement and protocol used for the wireless network configured of the gateways 2 to 7 and the control apparatus 8.

<1-2-2. Processor 302>

A processor 302 is, for example, a CPU (central processing unit), an MPU (microprocessor) or a single-chip microcomputer, and executes a software function module and a buffer test module. When the software function module is executed, the transfer gateway 3 is operated. The buffer test module inspects periodically the buffer of the apparatus to calculate a delay time, and sends the result to the control apparatus 8 by the wireless communication interface 301.

<1-2-3. Memory 303>

A memory 303 is, for example, an internal storage device and stores a constant and a gateway routing table maintained in real time, and it is convenient for the gateway to transfer data to the next hop gateway on the basis of the gateway routing table.

<1-2-4. Power Supply Module 304>

A power supply module 304 supplies power to the transfer gateway 3, and for example, there can be used a form of a power source or a battery. The parameter used in the Embodiment 1 is not related to a remaining battery level, so that it can also be applied to a multiple gateway communication system including a gateway which supplies power based on the power source.

<1-3. Hardware Module of Control Apparatus 8>

Figure 3:
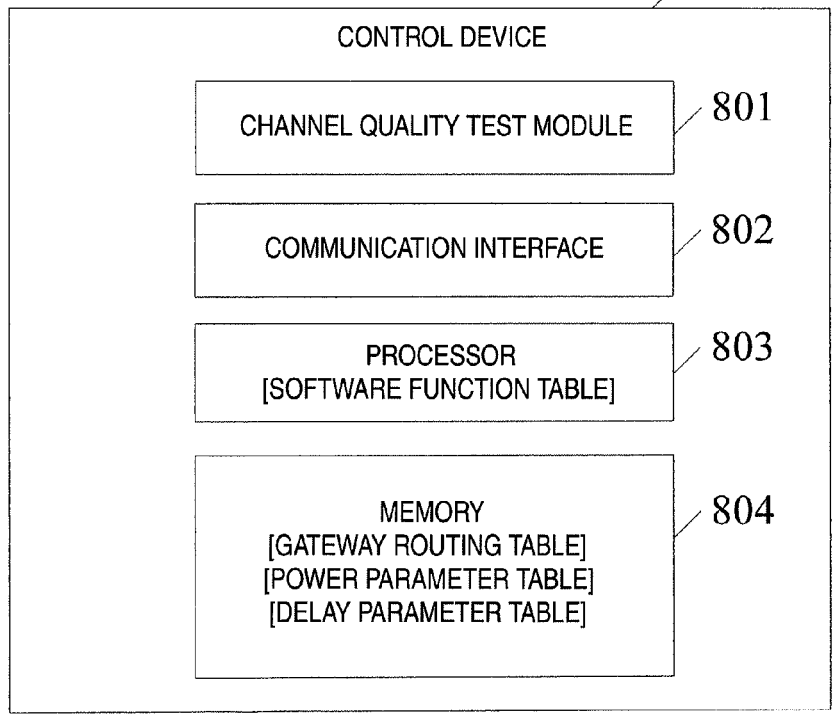
FIG. 3 is a hardware configuration diagram of the control apparatus according to Embodiment 1 of the present invention.

FIG. 3 is a hardware configuration diagram of the control apparatus according to Embodiment 1 of the present invention. The control apparatus 8 is required to have at least the hardware module shown in FIG. 3 to realize functions such as gateway information collection and analysis, maintenance of a routing table and others.

<1-3-1. Channel Quality Test Module 801>

A channel quality test module 801 collects power consumption between the neighboring gateways of the data transmission route contained in the multiple gateway communication system. Specifically, the channel quality test module 801 measures a channel quality index CQI of each gateway to select a necessary modulation frequency and transmission power. Each CQI corresponds to a necessary channel frequency, and power has a predetermined value and stored in a physical layer protocol of the gateway and the control apparatus.

<1-3-2. Communication Interface 802>

A communication interface 802 performs data communication with the gateway to collect data delay of each gateway on the data transmission route. Specifically, the communication interface 802 includes at least a wireless communication interface, and interactivity of data is realized by communicating with the gateways 2 to 7 of the network or another control apparatus 8 which is possibly provided.

<1-3-3. Processor 803>

On the basis of the power consumption and data delay stored in a memory 804 to be described later, a processor 803 adds priority to multiple data routes in the gateway routing table stored in the memory 804. Specifically, the processor 803 is, for example, a CPU (central processing unit), an MPU (microprocessor) or a single-chip microcomputer, realizes functions such as basic calculation, data processing or strategy judgment, and executes the software function module to operate the control apparatus 8.

<1-3-4. Memory 804>

The memory 804 stores the gateway routing table containing the multiple data transmission route, and the power consumption collected by the channel quality test module 801 and the data delay collected by the communication interface 802. Specifically, the memory 804 is, for example, an internal storage device and stores a gateway routing table which is maintained in real time, a power parameter table and a delay parameter table.

<1-4. Explanation of Power Consumption and Data Delay>

Two parameters of power consumption and data delay used in Embodiment 1 are described in detail. The following Table 1 specifically shows details of conditions of data delay and power consumption.

TABLE 1

Data delay parameter, power consumption parameter and their collection methods

| | Information | Parameter | Collection method |
|---|---|---|---|
| Data delay | Gateway busy/idle state | T = delay time (ms) | Collection from gateway information (communication interface 802) |
| Power consumption | Power consumption of adjacent gateway device | P = power consumption (mW) | Calculation from channel quality (channel quality test module 801) |

As shown in the second row of Table 1, the states (busy/idle) of the transfer gateways 3 to 6 are defined by a data delay due to a quantized buffer, its unit is a millisecond, and such information is collected by a buffer test module which is included in the processor 302 of the gateway device and sent from the gateway to the control apparatus 8. If a long data delay is generated by the gateway, the route optimization parameter of the route, to which the gateway belongs, decreases, and the selection probability decreases. A calculating formula for the delay time is represented by a mathematical formula 1.

$$T = n \cdot \text{data amount in buffer}/\text{processing speed} \quad \text{[Mathematical formula 1]}$$

In the mathematical formula 1, n denotes a constant, the data amount in the buffer is updated in real time by the gateway, and the processing speed is a previously stored value determined by the gateway hardware device.

As shown in the third row of Table 1, the power consumption by the adjacent gateway device is defined by the unit transmission power, its unit is milliwatt, and the information is established according to the channel quality index (CQI) collected by the test module 801. For selection, a transmission channel corresponding to the channel quality index CQI value, a frequency and a power value are stored for a physical layer protocol.

<1-5. Operation of Control Apparatus 8>

Figure 4:
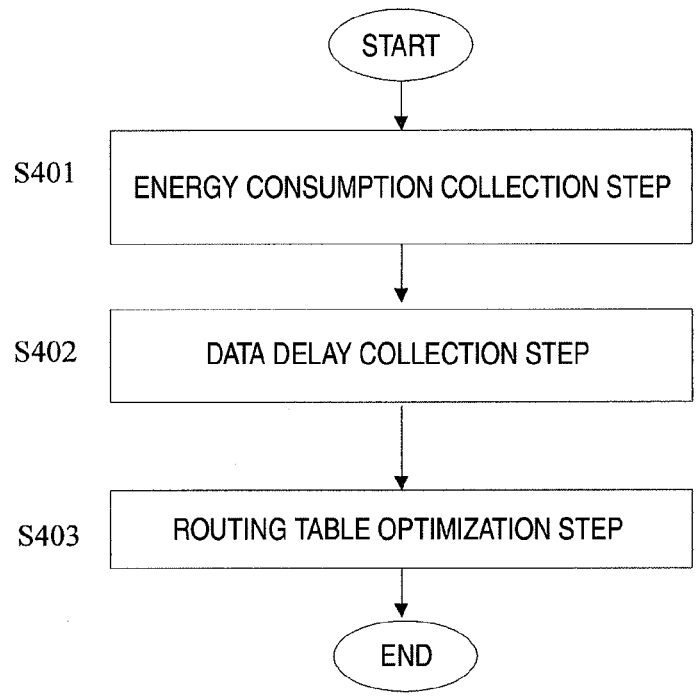
FIG. 4 is a flow chart of the control method used for the control apparatus according to Embodiment 1 of the present invention.

FIG. 4 is a flow chart of a control method used for the control apparatus according to Embodiment 1 of the present invention. As shown in FIG. 4, the control method used for the control apparatus 8 includes the following steps.

<1-5-1. Power Consumption Collection Step S401>

In a power consumption collection step S401, power consumption between adjacent gateways of data transmission route is collected. A specific collection method is same as above, and its description is omitted.

<1-5-2. Data Delay Collection Step S402>

In a data delay collection step S402, data delays of respective gateways of the data transmission route is collected. A specific collection method is same as above, and its description is omitted here. The order of the power consumption collection step S401 and the data delay collection step S402 may be changed.

<1-5-3. Routing Table Optimization Step S403>

In a routing table optimization step S403, priority is added to the multiple data transmission routes in the gateway routing table on the basis of the power consumption collected in the power consumption collection step S401 and the data delays collected in the data delay collection step S402. Specifically, the priority of the data transmission route is calculated by a mathematical formula 2.

$$\delta = k \frac{1}{\sum P \cdot (\sum T + T_o)} \quad \text{[Mathematical formula 2]}$$

In the mathematical formula 2, $\delta$ denotes a route optimization parameter (priority judgment parameter of the data transmission route), k denotes a constant, $\sum P$ denotes a sum of power consumption for the route, $\sum T$ denotes a sum of delay times of respective transfer gateways of the route, To denotes a basic delay, namely a delay time due to an element such as the wireless communication other than the delay due to the overflow of gateway buffer of all routes, and it is a constant in the mathematical formula 2. The $\sum P$ is determined as a denominator, and the $\sum P$ value of a route having small power consumption increases the route optimization parameter $\delta$. Similarly, the $\sum T$ is also a denominator, and the $\sum T$ value of a route having a small delay increases the route optimization parameter $\delta$.

After the values of route optimization parameter $\delta$ are calculated, all $\delta$ values are arranged in descending order, the maximum value of $\delta$ is deemed to be a highest priority route, and the rest is identical. The numerical values arranged in descending order are written as route priority serial numbers in the gateway routing table. At this time, the gateway routing table is a complete routing table and can be referenced by the corresponding terminal side gateway 2 so as to select a route having the largest route optimization parameter (highest priority). If the route having the largest route optimization parameter has a defect, a route having the second largest route optimization parameter (second highest priority) is sequentially sent. The rest is identical.

<1-6. Operation of Terminal Side Gateway 2>

Figure 5:
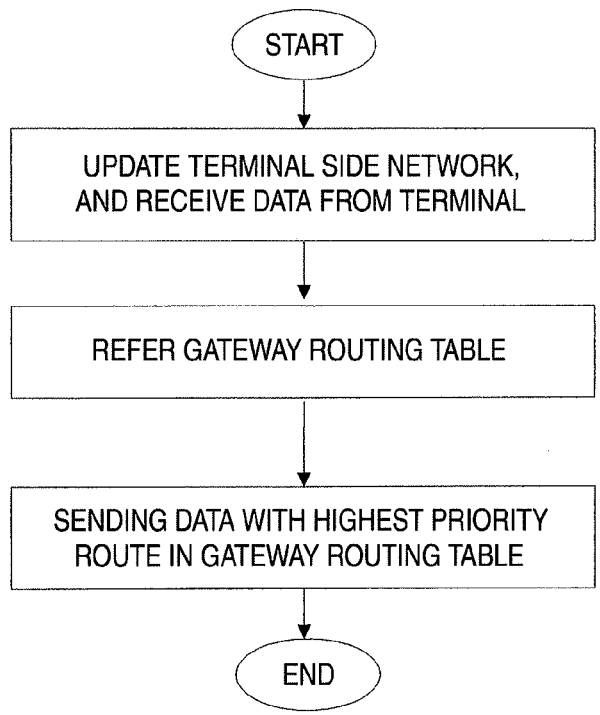
FIG. 5 is a flow chart of operation of the terminal side gateway according to Embodiment 1 of the present invention.

FIG. 5 is a flow chart of operation of the terminal side gateway according to Embodiment 1 of the present invention. As shown in FIG. 5, the terminal side gateway 2 first updates a terminal side network, and checks whether the terminal device is accessed on or off. If the terminal 1 is accessed on, data is received from the terminal 1. After the data is received, the gateway routing table is referenced. At this time, the gateway routing table may be obtained by requesting to the control apparatus 8, or the last gateway routing table obtained from the control apparatus 8 may be used. Last, the terminal side gateway 2 transfers data by using the highest priority data transmission route in the gateway routing table.

<1-7. Operation of Transfer Gateways 3 to 6>

Figure 6:
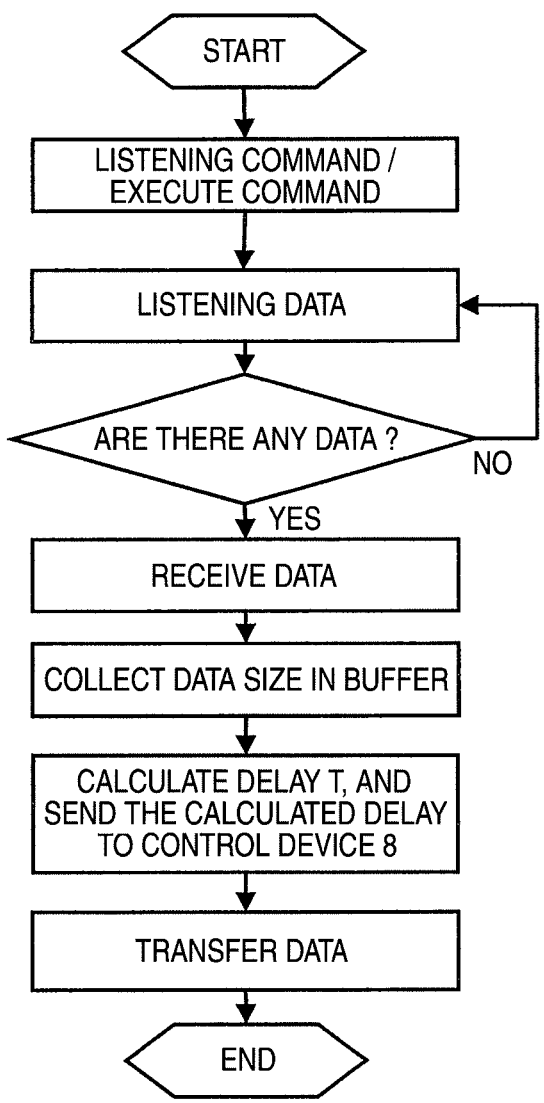
FIG. 6 is a flow chart of operation of the transfer gateway according to Embodiment 1 of the present invention.

FIG. 6 is a flow chart of operation of the transfer gateway according to Embodiment 1 of the present invention. As shown in FIG. 6, different from the terminal side gateway 2, the transfer gateways 3 to 6 first listen to a command. If there is a command, the command is executed, and if there is not a command, they listen to data. If there is data, data is received, a size of the data packet is calculated on the basis of information of data header. Thus, a size of data in the buffer is obtained, a delay time of the gateway is calculated on the basis of the formula, and the result is sent to the control apparatus 8. After that, a data transmission function is completed. If no data is listened, listening is continued.

<1-8. Effects>

According to Embodiment 1 of the present invention, the power consumption for data transmission by the multiple gateway communication system is reduced, and data delay can be educed, and the performance of the entire network can be improved by realizing both power consumption and delay.

<2. Embodiment 2>

Embodiment 2 of the present invention is described below with reference to FIG. 7. Embodiment 2 is an embodiment with an effective code rate added to Embodiment 1.

Embodiment 2 is similar to Embodiment 1 excepting the control apparatus and the control method used for the control apparatus, and their descriptions are omitted. In Embodiment 2, a control apparatus 8' and a control method used for the control apparatus 8' are described in detail.

<2-1. Hardware Module of Control Apparatus 8'>

Figure 7:
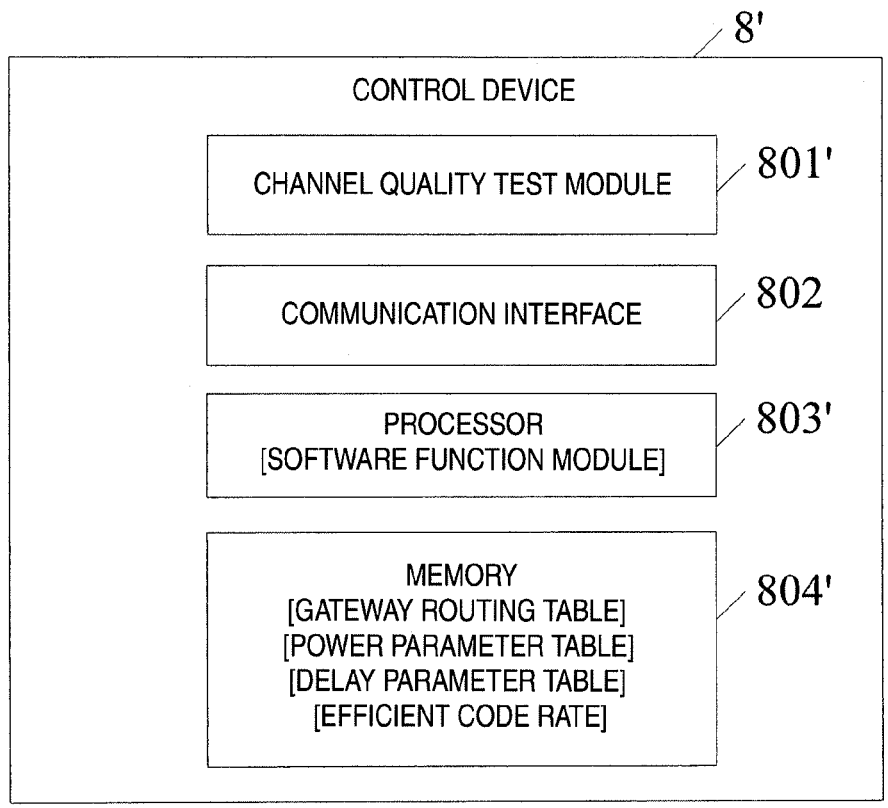
FIG. 7 is a hardware configuration diagram of the control apparatus according to Embodiment 2 of the present invention.

FIG. 7 is a hardware configuration diagram of the control apparatus according to Embodiment 2 of the present invention. As shown in FIG. 7, the control apparatus 8' is provided with at least the following hardware modules.

<2-1-1. Channel Quality Test Module 801'>

Similar to Embodiment 1, a channel quality test module 801' collects the power consumption between the neighboring gateways on the data transmission route contained in the multiple gateway communication systems and also collects the effective code rate of the data transmission route. Specifically, the channel quality test module 801' measures the channel quality index CQI of each gateway and determines the effective code rate according to the CQI. The effective code rate will be described later in detail.

<2-1-2. Communication Interface 802>

A communication interface 802 is same as in Embodiment 1, and its description is omitted.

<2-1-3. Processor 803'>

A difference between a processor 803' and the processor 803 of the Embodiment 1 is addition of priority to the multiple data transmission routes in the gateway routing table stored in a memory 804' on the basis of the power consumption, data delay and effective code rate stored in the memory 804' described later.

<2-1-4. Memory 804'>

Similar to Embodiment 1, the memory 804' stores the gateway routing table containing the multiple data transmission routes, the power consumption collected by the channel quality test module 801', and the data delay collected by the communication interface 802, and also stores the effective code rate collected by the channel quality test module 801'. Specifically, the memory 804' is, for example, an internal storage device, and stores a real-time maintained gateway routing table which is maintained in real time, a power parameter table, a delay parameter table and an effective code rate.

<2-2. Explanation of Effective Code Rate>

An effective code rate which is a parameter added to Embodiment 2 is described below in detail. The following Table 2 specifically shows a detail situation of three parameters of data delay, power consumption and effective code rate used in Embodiment 2. Among them, since the data delay and the power consumption are same as in Embodiment 1, their descriptions are omitted here.

TABLE 2

Data delay parameter, power consumption parameter, effective code rate parameter and their collection methods

| | Information | Parameter | Collection method |
| --- | --- | --- | --- |
| Data delay | Gateway busy/idle state | T = delay time (ms) | Collection from gateway information (communication interface 802) |
| Power consumption | Power consumption of adjacent gateway devices | P = power consumption (mW) | Calculation from channel quality (channel quality test module 801) |
| Effective code rate | Forward error correction code rate | CR = effective code rate (%) | Calculation from channel quality (channel quality test module 801) |

The forward error correction code rate is indicated by an effective code rate CR as shown in the fourth row of Table 2, and its unit is a percentage of the actually transmitted effective data occupying the whole data packet. Such information is established by the channel quality index CQI collected by the channel test module 801'. For the physical layer protocol, a reliability numerical value required to correspond with the selected channel quality index CQI value is stored so that the control apparatus 8' makes selection. If a distance increases larger and larger under the condition that the reliability is established, the percentage occupied by the necessary forward error correction code increases, and the effective code rate CR decreases.

<2-3. Operation of Control Apparatus 8'>

Respective steps of the control method used for the control apparatus 8' according to Embodiment 2 are substantially same as in Embodiment 1, and a difference is addition of an effective code rate collection step for collecting effective code rates of data transmission routes. Among the above steps, the sequence of the power consumption collection step, the data delay collection step and the effective code rate collection step is arbitrary. Specific collection methods are already described above, and their descriptions are omitted here.

In the routing table optimization step, priority is added to the multiple data transmission routes in the gateway routing table on the basis of the collected power consumption, data delay and effective code rate. Specifically, priority of data transmission route can be calculated by the mathematical formula 3.

$$\delta = k \frac{CR}{\sum P \cdot (\sum T + T_o)} \quad \text{[Mathematical formula 3]}$$

In the mathematical formula 3, δ denotes a route optimization parameter (priority judgment parameter of data transmission route), k denotes a constant, CR denotes an effective code rate of the route, namely an effective code rate after the route reliability is established, ΣP denotes a sum of power consumption for the route, ΣT denotes a sum of delay time of the respective transfer gateways of the route, and To denotes a basic delay, namely, a delay time due to an element such as the wireless communication other than the delay due to the overflow of the gateway buffer of all routes, and it is a constant in the mathematical formula 3. The CR is determined as a numerator such that a route having a high effective code rate has a high route optimization parameter δ. The ΣP is determined as a denominator, and the ΣP value of a route having small power consumption increases the route optimization parameter δ. Similarly, the ΣT is also a denominator, and the ΣT value of a route having a small delay increases the route optimization parameter δ.

After the values of the route optimization parameter δ are calculated, all the δ values are arranged in descending order, the maximum value of δ is deemed to be a highest priority route, and the rest is identical. The numerical values arranged sequentially are written as route priority serial numbers in the gateway routing table. At this time, the gateway routing table is a complete routing table and can be referenced by the corresponding terminal side gateway 2 so as to select a route having the largest route optimization parameter (highest priority). If the route has a defect, a route having the second largest route optimization parameter (second highest priority) is sequentially sent. The rest is identical.

<2-4. Effects>

According to Embodiment 2 of the present invention, the power consumption for data transmission by the multiple gateway communication system is reduced, the data delay is reduced, and the effective code rate can be improved. And, simultaneous consideration of the power consumption, the delay and theb effective code rate is realized, and the entire network performance is improved.

<3. Embodiment 3>

Embodiment 3 of the present invention is described below with reference to FIG. 8 to FIG. 12. Embodiment 3 is an embodiment with a data delay threshold added to Embodiment 1.

First, the whole concept of Embodiment 3 is briefly described below. That is, when an application request of the multiple gateway communication system is considered, one network has a possibility of having data of various different delay requests. For general data, its delay request range is large, and aging properties required for important data are small in its delay request threshold. Especially, for urgent data, more strict delay threshold control is required.

In response to the above request, the control apparatus of Embodiment 3 creates a multiple gateway routing table for the terminal side gateway on the basis of the different data delay request. At the early stage of network initialization, a different initial routing table created on the basis of the data delay threshold is sent to the terminal side gateway. When data is received by the terminal side gateway, the delay threshold demanded by the data and the delay threshold in the stored initial routing table are compared, and if the delay request is satisfied, a corresponding routing table is directly used, and if not, a request containing the threshold is sent to the control apparatus to obtain a new routing table. The control apparatus makes strategy decision on the basis of the threshold and other parameters, optimizes the initial routing table, and sends the optimized gateway routing table to the terminal side gateway so that it is used by the terminal side gateway.

Embodiment 3 is same as Embodiment 1 excepting the structure and processing related to the data delay threshold, and its descriptions are omitted. In Embodiment 3, the structure and processing related to the data delay threshold are described below in detail.

<3-1. Explanation of Data Delay Threshold>

As described above, the delay time is strictly defined in several applied scenes. For example, if data collected by the terminal is urgent data such as a fire alarm in smart building control, it is insufficient to perform route optimization by collecting only power consumption and delay in a data transmission route. At this time, it is necessary to consider a delay request of data source. Therefore, the terminal side gateway 2 needs to perform priority classification on the data collected by the terminal 1, and classification criteria need to classify on the basis of the delay threshold required for a different application request.

An example of a method to classify data by using the delay threshold is described below. According to this method, the data collected by the terminal 1 is set to three types of data having an extension area. Naturally, Embodiment 3 is not limited to the above, but another method can also be adopted, if necessary.

Figure 8:
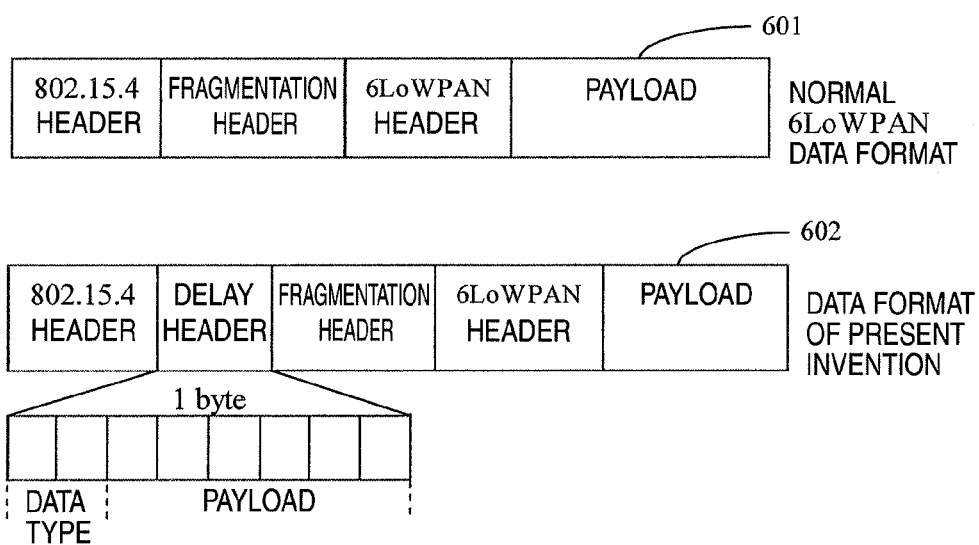
FIG. 8 is a schematic view of an example of the data format according to Embodiment 3 of the present invention.

FIG. 8 is a schematic view of an example of a data format according to Embodiment 3 of the present invention. In this embodiment, the network between a terminal device such as the terminal 1 and the terminal side gateway 2 may be a wired or wireless network. Here, the wireless network is used as an example, and for example, a 6LoWPAN protocol is used for a network layer. The upper half of FIG. 8 shows a data format 601 of a normal 6LoWPAN protocol. Headers are arranged in order of the outermost layer which is a MAC layer and p PHY layer header, e.g., an 802.15.4 header, a defragmentation information header, a network layer 6LoWPAN header, and an actual data payload at the end.

Since the above type of data format cannot fulfill the control of different delay thresholds in the multiple gateway communication system, a data format 602 which is sent by the terminal 1 in this embodiment adds one byte of the delay header after the outermost layer 802.15.4 header as shown in the lower half of FIG. 8, and two bits before that header denote a data type. The data type includes three kinds of fixed types and one kind of extensible type.

As for data types in FIG. 8, a bit pattern 00 is a basic data type, namely a data type without delay threshold limitation, and a payload bit is empty at this time.

A bit pattern 01 and a bit pattern 10 for data type are two kinds of data types with the delay threshold set to a fixed value, the delay threshold at this time is defined on the basis of an actual application type, and the payload bit is empty.

11 is an extensible type, namely the data delay threshold is smaller than the time of the previous two kinds of fixed value, and the payload bit at this time includes numerical value information of the delay threshold.

<3-2. Operation of Terminal Side Gateway 2>

Figure 9:
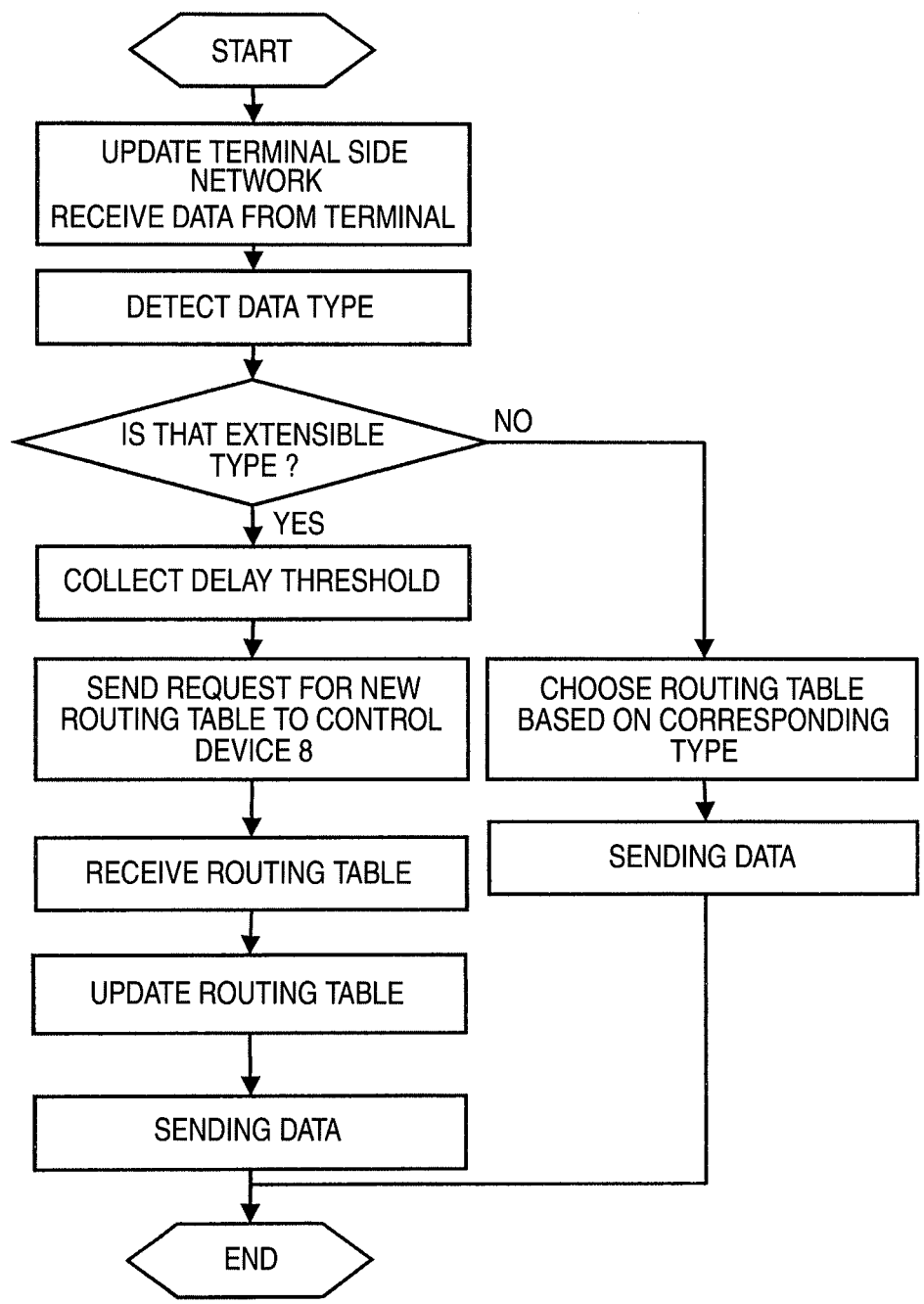
FIG. 9 is a flow chart of operation of the terminal side gateway according to Embodiment 3 of the present invention.

FIG. 9 is a flow chart of operation of the terminal side gateway according to Embodiment 3 of the present invention.

First, the terminal side gateway 2 updates the terminal side network and checks whether the terminal device is accessed on or off. If the terminal 1 is accessed on, data is received from the terminal 1. After receiving the data, data delay header is first detected, and a data type is judged. If the type is 11 in the above-described embodiment, it means an extensible type, and an afterward extended payload bit stores a new delay time, a new gateway routing table request is sent under this condition, and after it is received, the data is sent on the basis of the routing table. If it is a fixed type, the data is sent in accordance with the routing table stored according to the types. Thus, one transmission/reception cycle is completed.

<3-3. Operation of Control Apparatus 8>

Figure 10:
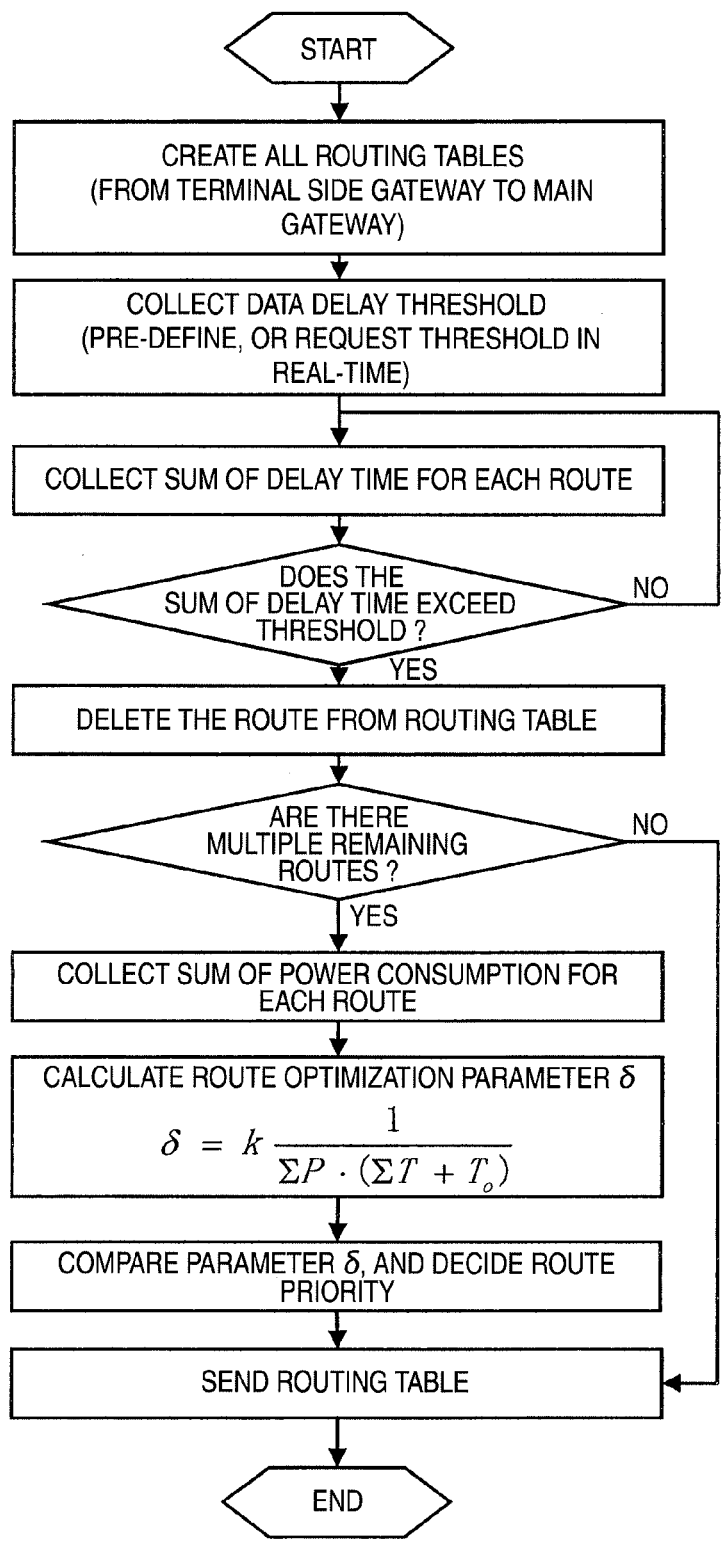
FIG. 10 is a flow chart of the control method used for the control apparatus according to Embodiment 3 of the present invention.

FIG. 10 is a flow chart of a control method used for the control apparatus according to Embodiment 3 of the present invention.

First, all routing tables between the terminal side gateway and the main gateway are created, and the gateway routing table includes parameters such as a sum of a delay time, a sum of power consumption, a route optimization parameter δ, and route priority serial numbers of respective routes. A method of creating the gateway routing table is same as in Embodiment 1, and its description is omitted.

Then, the data delay threshold is updated on the basis of presetting or a real time data delay request. After that, data delay times of all gateways are collected, and a sum of delay times of the respective routes is calculated and compared with the threshold. After the comparison, any route exceeding the threshold request is deleted from the routing table, and the routes satisfying the request are held. If the number of routes at this time is 0, error information is sent. If the number of routes at this time is 1, the route priority serial number of the route is set to 1, and the route information is sent to the terminal side gateway. At this time, if the number of routes is larger than 1, a sum of power consumption is collected from the gateway. The route optimization parameter δ is calculated on the basis of the mathematical formula 4.

$$\delta = k \frac{1}{\sum P \cdot (\sum T + T_o)}$$ [Mathematical formula 4]

In the mathematical formula 4, δ denotes a route optimization parameter (priority judgment parameter of data transmission route), k denotes a constant, $\Sigma P$ denotes a sum of power consumption for the route, $\Sigma T$ denotes a sum of delay times of respective transfer gateways of the route, To denotes a basic delay, namely a delay time due to an element such as the wireless communication other than the delay due to the overflow of gateway buffer of all routes, and it is a constant in the mathematical formula 4.

Last, the priority added gateway routing table is sent to the terminal side gateway 2 so that the terminal side gateway 2 selects the high priority data transmission route and performs data transmission.

And, the transfer gateways 3 to 6 have the same operation as in Embodiment 1, and their descriptions are omitted here.

<3-4. Message Time Sequence of Multiple Gateway Communication System>

A message time sequence of the multiple gateway communication system is further described below.

<3-4-1. Representative Network Initialization/Message Update Time Sequence>

Figure 11:
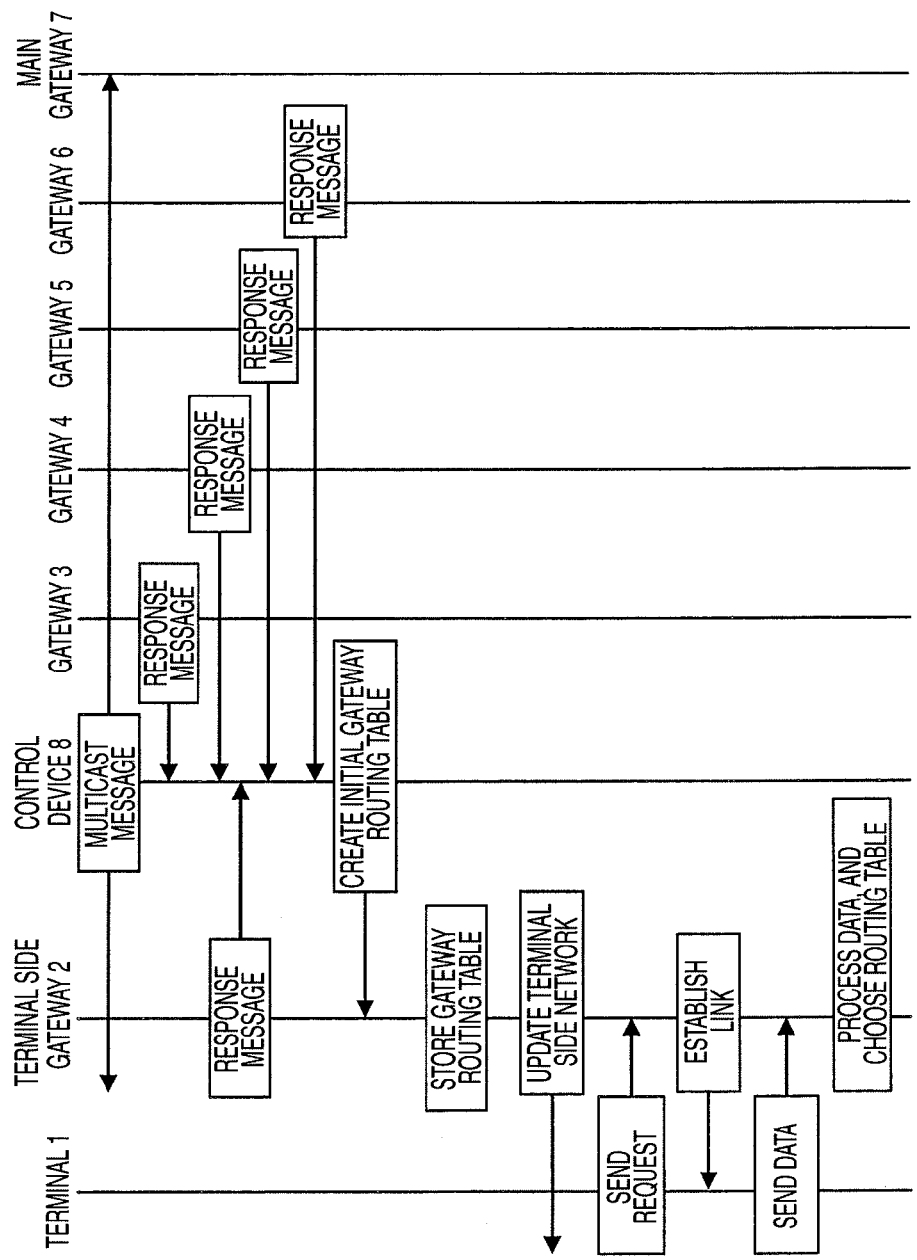
FIG. 11 is a time-sequence diagram of representative network initialization/message update of the multiple gateway communication system according to Embodiment 3 of the present invention.

FIG. 11 is a time-sequence diagram of representative network initialization/message update of the multiple gateway communication system according to Embodiment 3 of the present invention.

When network initialization or network update is started, a multicast message is first sent by the control apparatus 8. This message contains an ID of the network and a gateway parameter request. The gateway having received the message responds a message, the response message of the terminal side gateway 2 contains the gateway ID, the thresholds of the stored three data types and the channel quality index CQI, and the response messages of the transfer gateways 3 to 6 contain gateway IDs, gateway delay times T and values of channel quality indexes CQI.

After waiting a predetermined time, the control apparatus 8 considers that the message-responded gateway is all gateways of the network, then creates the entire routing table for the terminal side gateway 2, and creates initial gateway routing tables on the basis of the thresholds of three data types sent from the terminal side gateway 2. Then, the initial gateway routing tables are sent to the terminal side gateway 2.

After receiving the initial gateway routing tables, the terminal side gateway 2 stores them in its memory. Then, the terminal side network is updated, and it is checked whether a new terminal device is accessed on or an existing device is accessed off. If there is a send request of a new terminal 1 at the time of updating, it is necessary to establish a link. After the link is established, the terminal device can send data to the terminal side gateway 2, data processing is performed by the terminal side gateway 2, and an appropriate routing table is chosen for data transmission.

What is described above is a message flow chart at the time of representative network initialization or updating. At the operation of the network, updating of the gateway routing table is more flexible. And, it is also possible that the control apparatus 8 sends a command to the gateways, the gateways 3 to 6 feed back a necessary parameter in real time, and the routing table is updated and retransmitted.

After the flow chart of FIG. 11 is completed, the network enters an operation condition.

<3-4-2. Representative Data Transmission Message Time Sequence>

Figure 12:
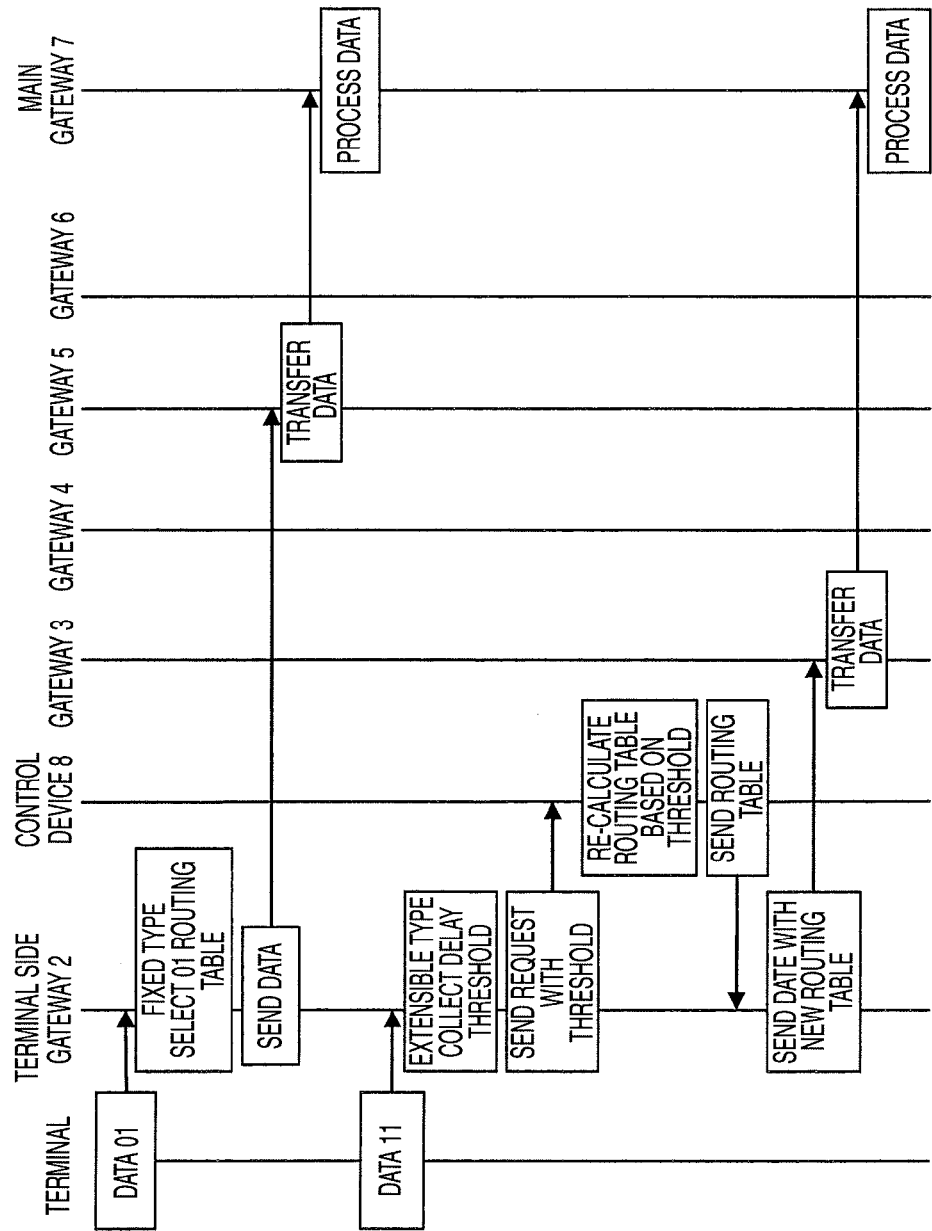
FIG. 12 is a time-sequence diagram of a representative data transmission message of the multiple gateway communication system according to Embodiment 3 of the present invention.

FIG. 12 is a time-sequence diagram of a representative data transmission message of the multiple gateway communication system according to Embodiment 3 of the present invention.

If the data sent from the terminal 1 to the terminal side gateway 2 is type 01 after the multiple gateway communication system enters the operation condition through the process shown in FIG. 11, the terminal side gateway 2 performs processing and analysis of the data, takes out data type 01, and judges as a fixed type. Therefore, selection is made from the stored 01 type gateway routing table, and data is transferred on the basis of the routing table. Referring to the gateway 5 of FIG. 12 as an example, the terminal side gateway 2 sends the data to the gateway 5 on the basis of the routing table, the gateway 5 sends to the main gateway 7 on the basis of the routing table, and all the processes from the terminal to the main gateway 7 are completed.

If the data sent from the terminal 1 to the terminal side gateway 2 is type 11, the terminal side gateway 2 performs processing and analysis of the data, data type 11 is taken out, and it is judged as an extensible type. Therefore, the actual threshold in an extension bit after the flag bit is continuously taken out, and a request having the threshold is sent to the control apparatus 8. Based on the delay threshold, the control apparatus 8 calculates a new gateway routing table by using the latest data in the parameter table stored in the memory, and sends the calculated routing table to the terminal side gateway 2. The terminal side gateway 2 determines the received gateway routing table as the routing table for sending the data, and transfers the data on the basis of the routing table. Referring to the gateway 3 of FIG. 12, the terminal side gateway 2 sends the data to the gateway 3 on the basis of the routing table, the gateway 3 sends to the main gateway 7 on the basis of the routing table, and all the processes from the terminal to the main gateway 7 are completed.

<3-5. Effects>

According to Embodiment 3, when important data and urgent data (e.g., fire alarm data in smart building control) are received from the first gateway of the data transmission route, it is possible to send on the basis of the requested delay threshold, and appropriate transmission of the important data and urgent data can be secured.

<4. Embodiment 4>

Embodiment 4 of the present invention is described below with reference to FIG. 13. Embodiment 4 is an embodiment with an effective code rate added to Embodiment 3.

Embodiment 4 is similar to Embodiment 3 excepting a control apparatus and a control method used for the control apparatus, and its description is omitted. In Embodiment 4, the structure of the control apparatus is same as that of the control apparatus 8' of Embodiment 2 (see FIG. 7), and its description is omitted here. The control method used for the control apparatus 8' of Embodiment 4 is described below.

Figure 13:
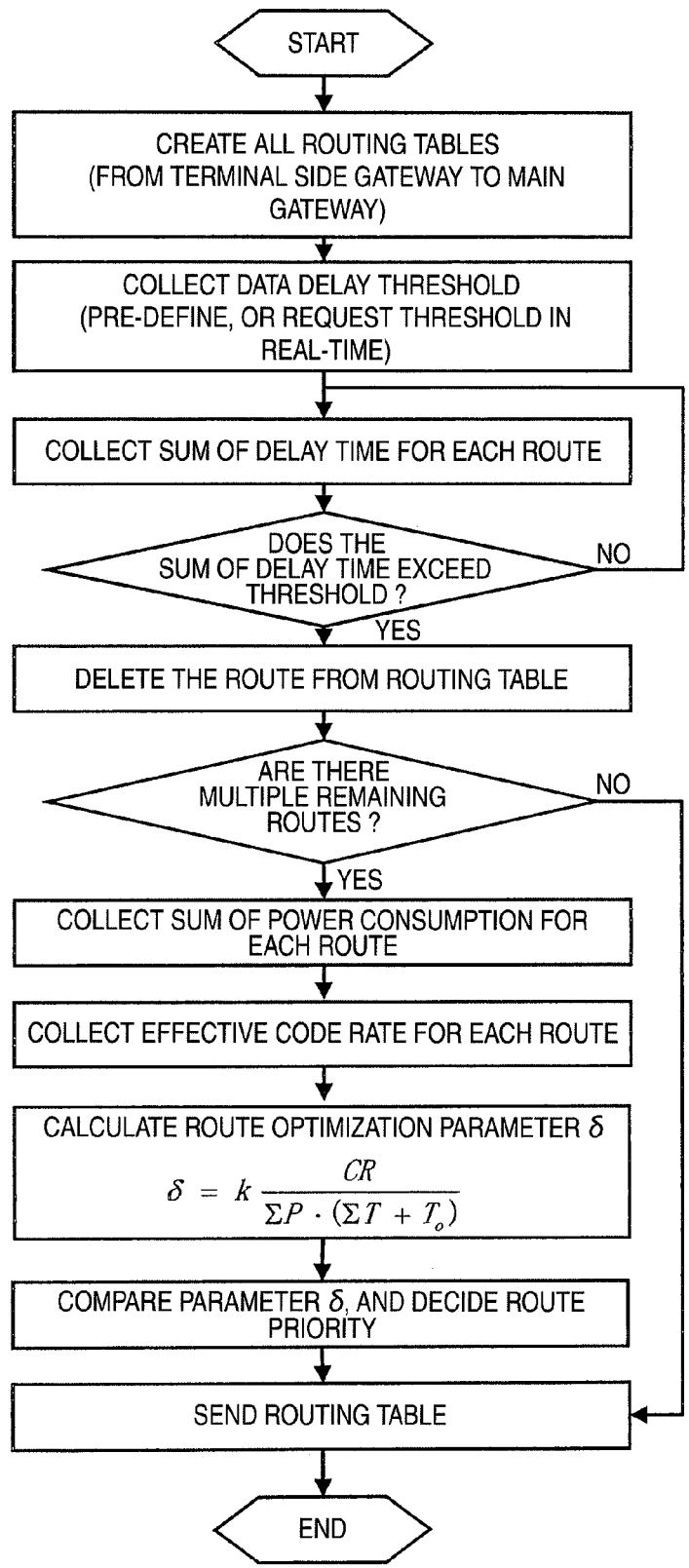
FIG. 13 is a flow chart of a control method used for the control apparatus according to Embodiment 4 of the present invention.

FIG. 13 is a flow chart of the control method used for the control apparatus according to Embodiment 4 of the present invention. As shown in FIG. 13, a difference between the operation of the control apparatus 8' of Embodiment 4 and the operation of Embodiment 3 is addition of an effective code rate CR for the above route to calculate the route optimization parameter (priority of data transmission route). Specifically, the following mathematical formula 5 is used to calculate a route optimization parameter 6.

$$\delta = k \frac{CR}{\sum P \cdot (\sum T + T_o)} \quad \text{[Mathematical formula 5]}$$

<5. Examples>

Two examples of the present invention are described below in detail with reference to FIG. 14 to FIG. 18.

<5-1. Example 1 >

Example 1 is based on the above-described Embodiment 3.

First, in a network initialization or update process, the multicast message is first sent by the control apparatus 8 as shown in FIG. 11. The message contains this network ID and a gateway parameter request. The parameter request at this time is gateway delay time T and channel quality index CQI.

Then, after receiving the multicast message, the gateways 3 to 6 need to respond this gateway ID, delay time T of the gateway and a value of the channel quality index CQI. The value of CQI is obtained from the predetermined values of the gateways 3 to 6 and is a fixed value. The delay time T is updated in real time on the basis of the data amount in the buffer. Example data and calculation process are as shown in Table 3 below.

TABLE 3

Table of numerical values of initial parameters of respective gateways and delay times T

| | Data amount in buffer | Processing speed | T | Remarks |
|---|---|---|---|---|
| Gateway 3 | 120K | 480 b/s | 4 ms | Calculation function is |
| Gateway 4 | 64K | 320 b/s | 5 ms | realized by gateways 3 |

TABLE 3-continued

Table of numerical values of initial parameters of respective gateways and delay times T

| | Data amount in buffer | Processing speed | T | Remarks |
|---|---|---|---|---|
| Gateway 5 | 128K | 640 b/s | 5 ms | to 6, and T is sent to |
| Gateway 6 | 64K | 128 b/s | 2 ms | control apparatus. |

In Table 3, the gateways 3 to 6 can obtain the data amount in its own buffer in real time and the processing speed peculiar to the hardware, and calculation is performed by the following mathematical formula 6.

$$T = n \cdot \text{data amount in buffer} / \text{processing speed} \quad \text{[Mathematical formula 6]}$$

In the mathematical formula 6, a unit constant n is determined as 1, and the delay time T of the gateway is determined. And, the data is sent to the control apparatus 8 in real time.

At the same time, the response message of the terminal side gateway 2 contains the gateway ID, the thresholds of the stored three data types and the channel quality index CQI.

Subsequently, after waiting for a predetermined time, the control apparatus 8 checks that the message-responded gateways are all gateways of the respective data transmission routes of this network. In this Example, they are gateways 3 to 6. Then, the control apparatus 8 first creates a gateway routing table of the terminal side gateway 2 and lists all routes. Based on the gateway message received after that, the delay time is stored, the channel frequency and power between the gateways are selected on the basis of the CQI parameters of the respective gateways, and the power consumption to send the unit data among the respective gateways is obtained.

Figure 14:
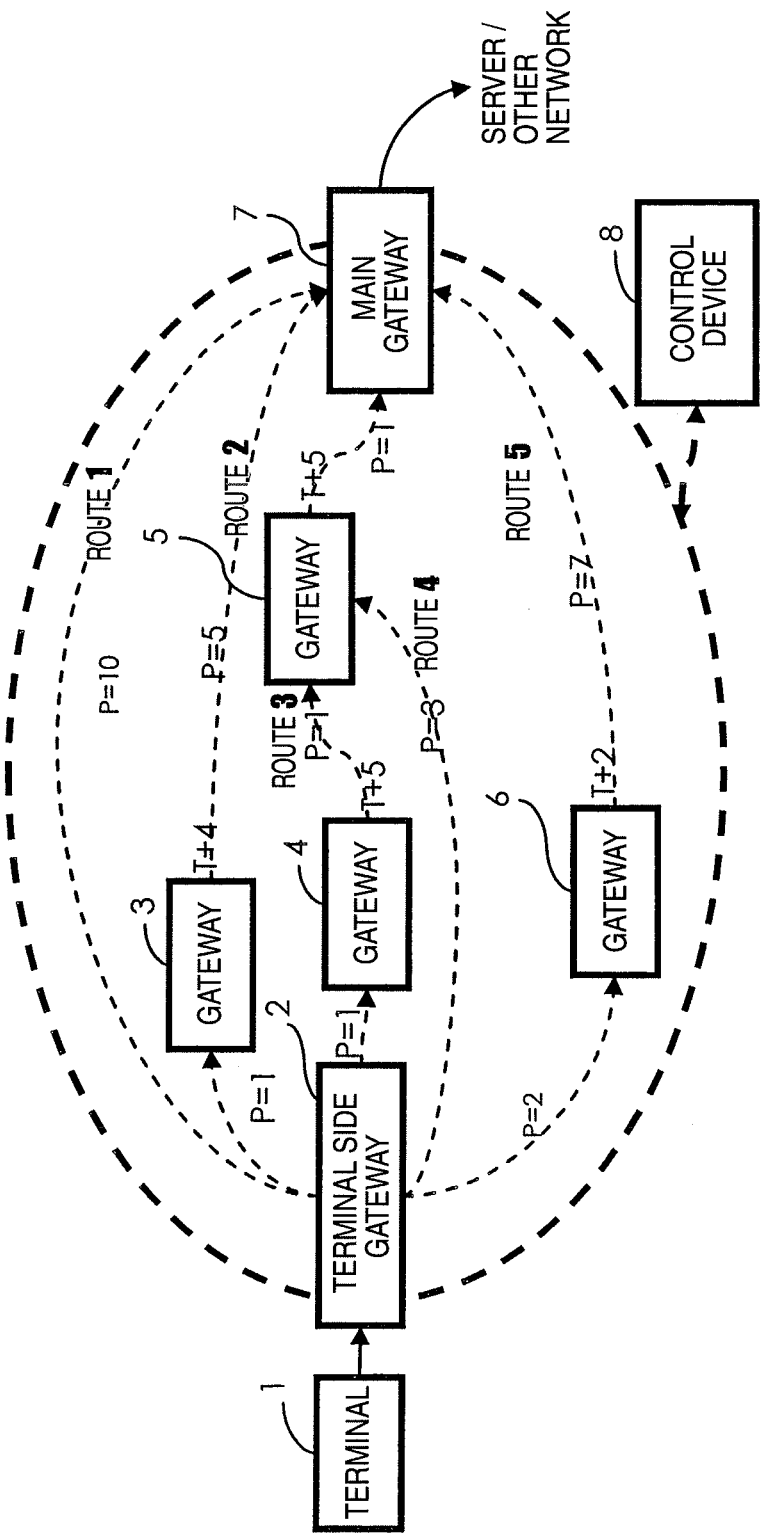
FIG. 14 is a diagram of a network module with a parameter of the multiple gateway communication system according to Example 1 of the present invention.

FIG. 14 is a diagram of a network module with a parameter of the multiple gateway communication system according to Example 1 of the present invention. In the diagram, the obtained P and T parameters are shown in the corresponding power parameter table and delay parameter table.

TABLE 4

Power parameter table

| | Between gateways | | | | | | | | |
|---|---|---|---|---|---|---|---|---|---|
| | 2-3 | 2-4 | 2-5 | 2-6 | 2-7 | 3-7 | 4-5 | 5-7 | 6-7 |
| Power consumption P (mW) | 1 | 1 | 3 | 2 | 10 | 5 | 1 | 1 | 7 |

The power parameter table shown in Table 4 shows power consumption to send the unit data between two gateways, and in the Table, the first row shows transmission between the gateways, and the second row shows power consumption numerical values. For example, 2-3 in the second column shows that power consumption required for unit data transmission between the gateway 2 and the gateway 3 is 1 mW. And, 2-4 in the third column shows that power consumption required for unit data transmission between the gateway 2 and the gateway 4 is 1 mW. What is not shown in the table indicates that communication cannot be performed because a distance between two gateways is separated far from each other or channel quality does not match. For example, 3-5 or 3-6 is the case.

TABLE 5

Delay parameter table

| Gateway | 3 | 4 | 5 | 6 | T0 |
|---|---|---|---|---|---|
| Delay T (ms) | 4 | 5 | 5 | 2 | 0.5 |

The delay parameter table shown in Table 5 shows data delay due to waiting to be processed of an existing predetermined amount of data in the buffer via the gateway. The first row is gateway ID, and the second row is delay time. For example, the second column shows that the gateway 3 has a delay time of 4 ms at this time.

After completing the gateway information collection, the calculation process in the gateway routing table comes next. The control apparatus 8 performs operation shown in FIG. 10 on the basis of the thresholds of the three data types sent from the terminal side gateway 2, calculation of the initial gateway routing table is performed in three times under different thresholds. The constant k of the mathematical formula used in FIG. 10 is set to 1 in this Example. Then, three initial gateway routing tables are sent to the terminal side gateway 2. Table 6 is a gateway routing table at the time when the delay threshold is 12 ms.

TABLE 6

Gateway routing table with data delay threshold of 12 ms

| | Route | ΣP (mW) | ΣT (ms) | δ | Priority |
|---|---|---|---|---|---|
| Route 1 | MGW | 10 | 0 | 0.2 | 1 |
| Route 2 | GW3-MGW | 6 | 4 | 0.037 | 4 |
| Route 3 | GW4-GW5-MGW | 3 | 10 | 0.032 | 5 |
| Route 4 | GW5-MGW | 4 | 5 | 0.045 | 2 |
| Route 5 | GW6-MGW | 9 | 2 | 0.044 | 3 |

After receiving the initial gateway routing table, the terminal side gateway 2 stores it in its memory. It updates the terminal side network, and checks whether a new terminal device is accessed on or an existing device is accessed off. In this Example, if there is a send request of the new terminal 1 at the time of updating, it becomes necessary to establish a link. After the link is established, the terminal 1 can send data to the terminal side gateway 2. The terminal side gateway 2 performs data processing, and chooses a routing table appropriate for data transmission.

The above description covers a data transmission method in the case where the data sent from the terminal 1 is fixed data. If the terminal 1 needs to send several urgent data, such as fire alarm involved in, for example, the smart building control, it is necessary to consider a more strict delay threshold request. As shown in the data format of FIG. 8, when the data type is 11, extensible data is shown, a real time threshold request is obtained by a payload bit at the data delay header, and the gateway routing table can be updated. Its message process is as shown in FIG. 12.

The update method of the above gateway routing table also uses the operation of FIG. 10, deletes a route not satisfying the threshold from the threshold decision module, and calculates the route optimization parameter δ for the remaining route. In this Example, the delay threshold is set to 5 ms, 0.5 ms of $T_0$ itself is subtracted, and the ΣT value is 4.5 ms or less. Based on this parameter, the gateway routing table shown in Table 7 can be obtained.

TABLE 7

Gateway routing table with data delay threshold of 5 ms

| | Route | ΣP (mW) | ΣT (ms) | δ | Priority |
|---|---|---|---|---|---|
| Route 1 | MGW | 10 | 0 | 0.2 | 1 |
| Route 2 | GW3-MGW | 6 | 4 | 0.037 | 3 |
| Route 3 | GW4-GW5-MGW | 3 | 10 | 0.032 | X |
| Route 4 | GW5-MGW | 4 | 5 | 0.045 | X |
| Route 5 | GW6-MGW | 9 | 2 | 0.044 | 2 |

Table 7 shows a gateway routing table when the data type is 11 (data delay threshold of 5 ms), and since route 3 and route 4 have the total delay exceeding the delay threshold request, their route priority serial numbers are emptied and cannot be applied. Remaining route 1, route 2 and route 5 satisfy the delay request, the priority serial numbers are arranged sequentially on the basis of the route optimization parameter and after completing, and this table is sent to the terminal side gateway 2.

Figure 15:
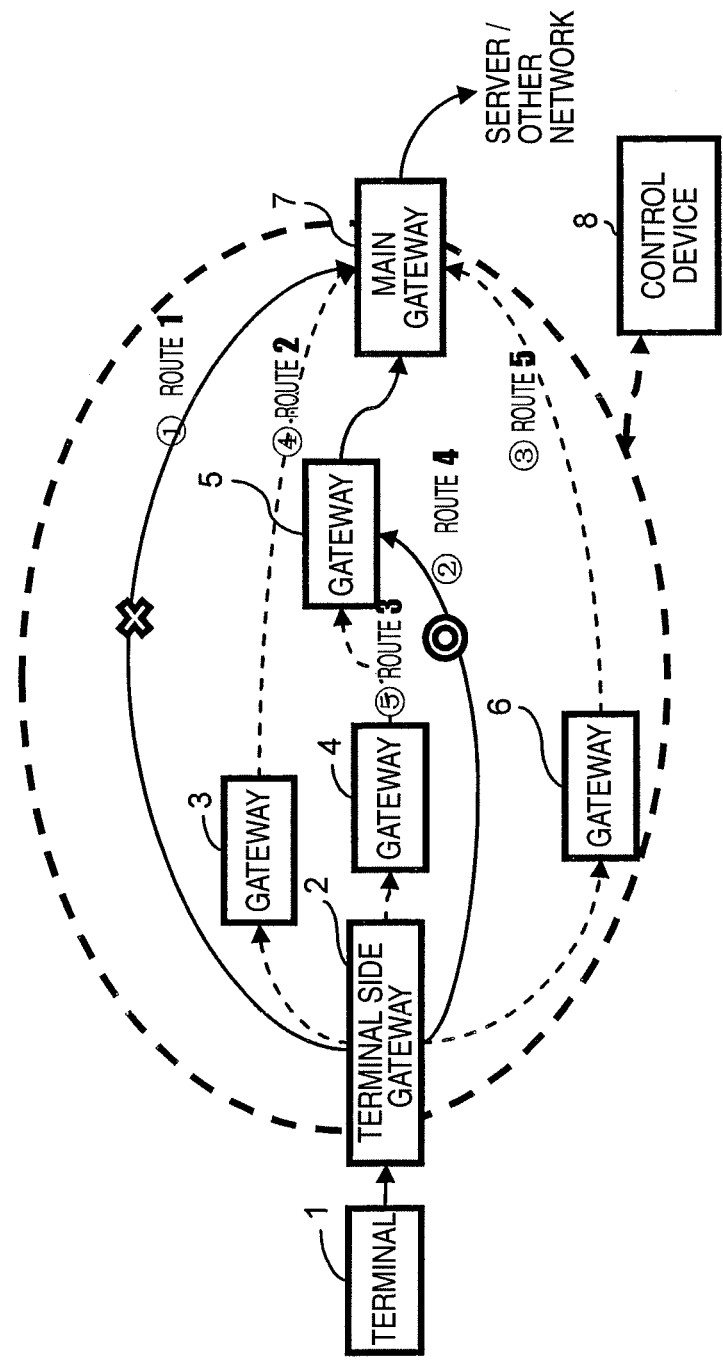
FIG. 15 is a diagram of a network model of a case where an optimized route has a defect in the multiple gateway communication system according to Example 1 of the present invention.

In the process of using the gateway routing table of Table 7, if the highest priority route extracted on the basis of Table of the terminal side gateway 2 has a defect, the second highest priority route is chosen until the gateway routing table is updated. FIG. 15 is a diagram of a network model of a case where the optimized route of the multiple gateway communication system according to Example 1 of the present invention had a defect. As shown in FIG. 15, since the highest priority route to be chosen by the gateway 2 had a defect, the second highest priority route 2 is chosen and data is transferred.

<5-2. Example 2>

Example 2 is based on Embodiment 4. It is apparent from Example 1 which is based on Embodiment 3 that if the terminal side gateway 2 can directly communicate with the main gateway 7, the direct route has very high priority because other gateways do not have a delay. However, if the terminal side gateway 2 is far separated from the main gateway 7, a large number of forward error correction codes are needed to satisfy predetermined data reliability. Thus, communication efficiency lowers, and communication time increases. Therefore, another parameter, which is effective code rate CR, is added in this Example 2 to further optimize the gateway routing table.

In the network initialization or update process, as shown in FIG. 11, a multicast message is first sent by the control apparatus 8', and the message contains an ID of this network and a gateway parameter request. The parameter request has gateway delay time T and channel quality index CQI.

Then, after receiving the multicast message, the gateways 3 to 6 need to respond the gateway ID, gateway delay time T and channel quality index CQI values. The CQI value is obtained from the predetermined values of the gateways 3 to 6 and is a fixed value. The delay time T is updated in real time on the basis of the data amount in the buffer. Example data and calculation process are same as in Example 1.

At the same time, the response message of the terminal side gateway 2 does not change and includes the gateway ID, the thresholds of the already stored three data types and the channel quality index CQI.

Subsequently, after waiting for a predetermined time, the control apparatus 8' checks that the message responded gateways are all gateways of this network. In this Example, they are gateways 3 to 6. Then, the control apparatus 8' first creates a gateway routing table of the terminal side gateway 2, and lists all routes. Based on the received gateway message, other delay times are stored, the channel frequency and power between gateways are selected on the basis of the CQI parameters of the respective gateways, and the power consumption to send the unit data among the respective gateways is obtained. In addition, the effective code rate CR is collected on the basis of the CQI value and the data reliability request of the previously stored main gateway.

Figure 16:
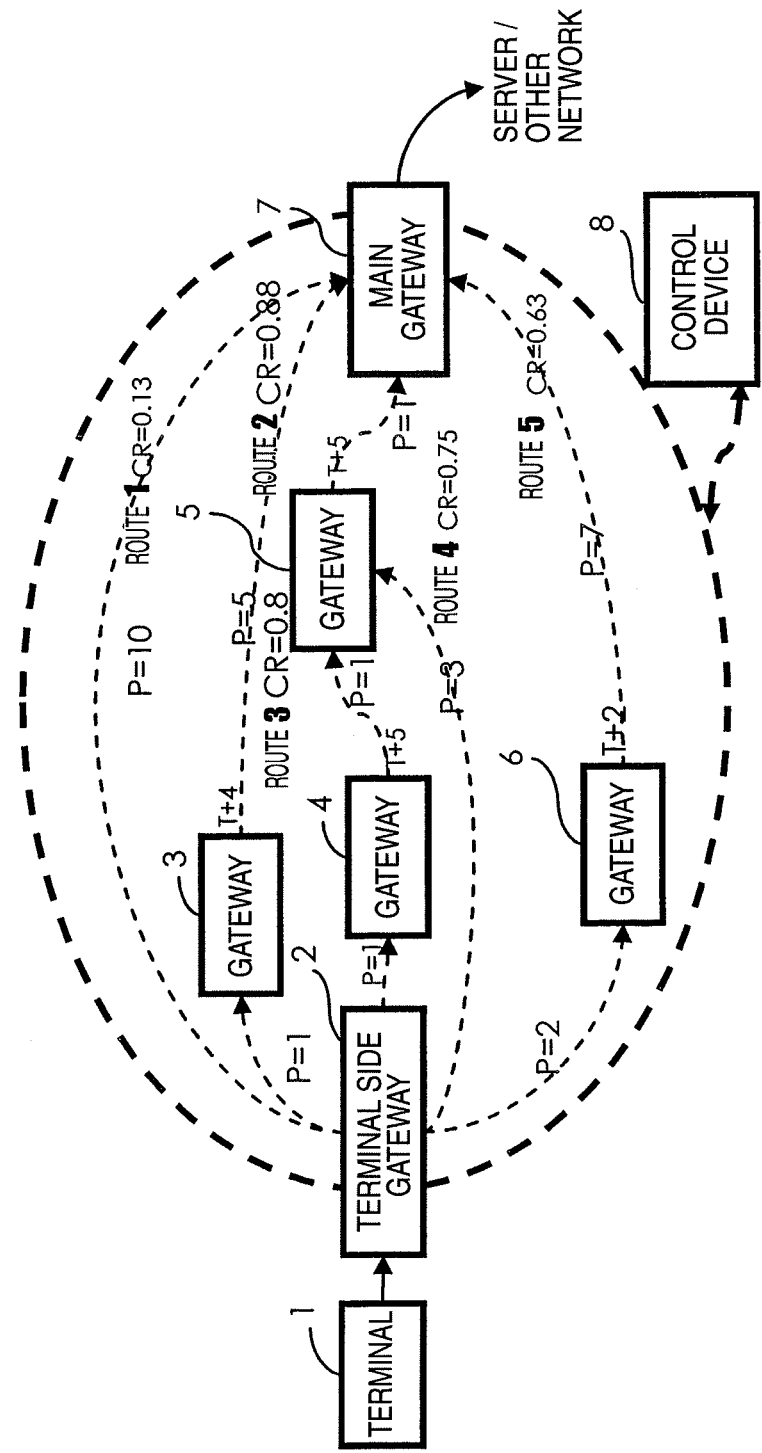
FIG. 16 is a diagram of a network model with a parameter of the multiple gateway communication system according to Example 2 of the present invention.

FIG. 16 is a diagram of a network model with a parameter of the multiple gateway communication system according to Example 2 of the present invention. Similar to Example 1, the obtained P and T parameters are shown in the corresponding power parameter table and delay parameter table. Effective code rates are as shown in the following Table 8.

TABLE 8

Effective code rates

| | Route 1 | Route 2 | Route 3 | Route 4 | Route 5 |
|---|---|---|---|---|---|
| Route | MGW | GW3-MGW | GW4-GW5-MGW | GW5-MGW | GW6-MGW |
| CR | 0.13 | 0.88 | 0.88 | 0.75 | 0.63 |

After completing the gateway information collection, the calculation process in the gateway routing table comes next. On the basis of the thresholds of the three data types sent from the terminal side gateway 2, the control apparatus 8' performs creation of an initial gateway routing table under different thresholds in three times according to the operation shown in FIG. 10. Then, three initial gateway routing tables are sent to the terminal side gateway 2.

TABLE 9

Gateway routing table with delay threshold of 12 ms

| Route | | ΣP (mW) | ΣT (ms) | CR | δ | Priority |
|---|---|---|---|---|---|---|
| Route 1 | MGW | 10 | 0 | 0.13 | 0.026 | 5 |
| Route 2 | GW3-MGW | 6 | 4 | 0.88 | 0.033 | 2 |
| Route 3 | GW4-GW5-MGW | 3 | 10 | 0.88 | 0.028 | 3 |
| Route 4 | GW5-MGW | 4 | 5 | 0.75 | 0.034 | 1 |
| Route 5 | GW6-MGW | 9 | 2 | 0.63 | 0.028 | 4 |

Similarly, after receiving the initial gateway routing table, the terminal side gateway 2 stores it in its memory. Then, it updates the terminal side network, and checks whether a new terminal device is accessed on or an existing device is accessed off. In this Example, if there is a send request of the new terminal 1 at the time of updating, it becomes necessary to establish a link. After establishing the link, the terminal 1 can send data to the terminal side gateway 2. The terminal side gateway 2 performs data processing and chooses a routing table appropriate for data transmission.

<5-3. Comparison between Example 1 and Example 2>

It is seen by comparing Table 6 of Example 1 and Table 9 of Example 2 that if conditions are same, the order of priority was changed after the CR value is added. The priority of the direct route 1 between the terminal side gateway 2 and the main gateway 7 lowers to change from the highest priority to the lowest priority. Thus, lowering of the communication efficiency generated when the terminal side gateway 2 and the main gateway 7 are separated far away from each other can be prevented.

In addition, the total delay and power consumption of Example 1 and Example 2 are compared. In order to make it easy to compare, it is assumed that the data packet size sent through the respective routes in Example 1 and Example 2 is same, and a calculating formula for the total consumption time required to successively send the respective data packets can be obtained.

$$\text{Total consumption time} = \frac{\text{Data packet size}}{\text{Effective code rate}} \times \left(\sum T + T_0\right) \quad \text{[Mathematical formula 7]}$$

Figure 17:
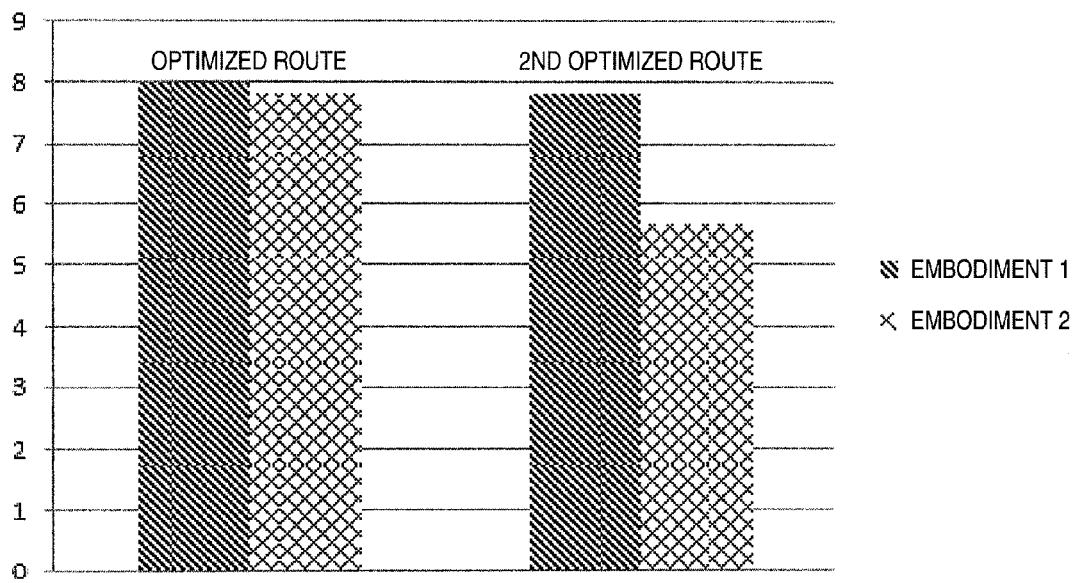
FIG. 17 is a comparative diagram of a total delay in Example 1 and Example 2 of the present invention.

The total consumption time of the respective routes can be calculated by the above mathematical formula 7. FIG. 17 is a comparative diagram of a total delay in Example 1 and Example 2 of the present invention. FIG. 17 shows total consumption time when the optimized routes and the second optimized routes of Example 1 and Example 2 have a data packet size of 1 and $T_0$ is 1 ms. As shown in FIG. 17, the total consumption time of two routes of Example 2 after CR parameter is considered is smaller than in Example 1. Thus, it is seen that the gateway routing table can be further optimized by addition of the CR parameter.

Subsequently, the power consumption required for transmission of the unit data packet is compared, and on the basis of the total power consumption of the respective routes obtained above and the total power consumption ΣP per unit time of the respective routes shown in Table 6 and Table 9, the total power consumption required for transmission of the unit data packets of the respective routes can be calculated by the following mathematical formula 8.

Total power consumption= total consumption time×ΣP     [Mathematical formula 8]

Figure 18:
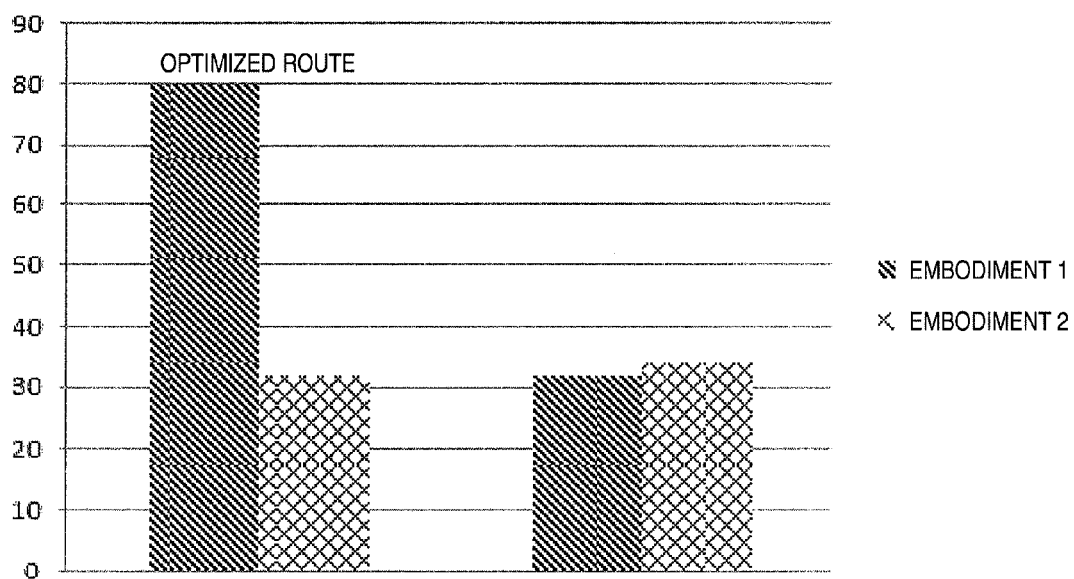
FIG. 18 is a comparative diagram of the total power consumption in Example 1 and Example 2 of the present invention.

FIG. 18 is a comparative diagram of the total power consumption between Example 1 and Example 2 of the present invention. In FIG. 18, it is determined that the unit size data packet is sent, and the unit is mW. As shown in FIG. 18, the total power consumption of optimized route of Example 2 after the CR parameter is considered is much smaller than in Example 1, and the power consumption of the second optimized route is not largely different from Example 1. Thus, it is seen that the gateway routing table can be further optimized by addition of the CR parameter.

The present invention has been described with reference to several representative embodiments and examples but is not limited to them, and various modifications and variations can also be made. It is intended that modifications and variations within the scope without departing from the spirit or scope of the present invention come within the scope of the present invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus for a multiple gateway communication system having multiple data transmission routes for transmitting data via gateways, comprising:
   a channel quality test module for collecting power consumption between adjacent gateways of the data transmission routes,
   a communication interface for collecting data delay of the respective gateways of the data transmission routes by performing data communication with the gateways,
   a memory for storing a gateway routing table containing the multiple data transmission routes, the power consumption collected by the channel quality test module, and the data delay collected by the communication interface, and a processor for adding priority to the data transmission routes in the gateway routing table stored in the memory on the basis of the power consumption and data delay stored in the memory, wherein the communication interface receives from the first gateway of the data transmission routes a data delay threshold requested for the data collected by the first gateway, the processor deletes the data transmission route having the total delay larger than the data delay threshold from the gateway routing table stored in the memory on the basis of the data delay threshold received from the communication interface and adds priority to the data transmission routes remained in the gateway routing table, the data collected by the first gateway is classified into an extensible type and a fixed type according to the data delay threshold, the processor previously created for the fixed type of data a gateway routing table with priority added, and the processor deletes for the extensible type of data a data transmission route having a total delay larger than the data delay threshold from the previously created gateway routing table on the basis of the delay threshold of a network routing table request sent from the first gateway to the communication interface, newly adds priority to the data transmission routes remained in the gateway routing table, and sends the gateway routing table, to which the priority is newly added, to the first gateway via the communication interface.

2. The control apparatus according to claim 1, wherein:
the channel quality test module further collects effective code rates of the data transmission routes,
the memory further stores the effective code rates collected by the channel quality test module, and
the processor adds priority to the data transmission routes in the gateway routing table stored in the memory on the basis of the power consumption, data delay and effective code rates stored in the memory.

3. A control method for a multiple gateway communication system having multiple data transmission routes for transmission of data via gateways, comprising:
a power consumption collection step for collecting, by a channel quality test module, power consumption between adjacent gateways of the data transmission routes,
a data delay collection step for collecting, by a communication interface, data delay of respective gateways of the data transmission routes,
a routing table optimization step for adding, by a processor, priority to the data transmission routes in the gateway routing table containing the multiple data transmission routes on the basis of the power consumption collected in the power consumption collection step and the data delay collected in the data delay collection step, and
a data delay threshold receiving step for receiving from a first gateway of the data transmission routes a data delay threshold which is requested for the data collected by the first gateway, wherein:
the routing table optimization step deletes a data transmission route having a total delay larger than the data delay threshold from the gateway routing table containing the multiple data transmission routes on the basis of the data delay threshold received in the data delay threshold receiving step, and adds priority to the data transmission routes remained in the gateway routing table,
the data collected by the first gateway is classified into an extensible type and a fixed type according to the data delay threshold,
the routing table optimization step creates previously for the fixed type of data a gateway routing table having priority added, and
the routing table optimization step further deletes for the extensible type of data a data transmission route having a total delay larger than the data delay threshold from the previously created gateway routing table on the basis of the data delay threshold of the network routing table request from the first gateway received in the data delay threshold receiving step, newly adds priority to the data transmission routes remained in the gateway routing table, and sends the gateway routing table, to which the priority is newly added, to the first gateway.

4. The control method according to claim 3, further comprising:
an effective code rate collection step for collecting, by the channel quality test module, effective code rates of the data transmission routes, wherein:
the routing table optimization step adds priority to the data transmission routes in the gateway routing table containing the multiple data transmission routes on the basis of the power consumption collected in the power consumption collection step, the data delay collected in the data delay collection step, and the effective code rates collected in the effective code rate collection step.

* * * * *

UNITED STATES PATENT AND TRADEMARK OFFICE
CERTIFICATE OF CORRECTION

PATENT NO. : 8,811,379 B2
APPLICATION NO. : 13/541828
DATED : August 19, 2014
INVENTOR(S) : Hideya Yoshiuchi et al.

Page 1 of 1

It is certified that error appears in the above-identified patent and that said Letters Patent is hereby corrected as shown below:

On the title page, column 1, item (30) should read:

(30)  Foreign Application Priority Data

Jul. 7, 2011   (CN)........................................ 201110189565.5

Signed and Sealed this
Seventh Day of April, 2015

Michelle K. Lee
*Director of the United States Patent and Trademark Office*